United States Patent
Zong et al.

(10) Patent No.: US 11,564,115 B2
(45) Date of Patent: Jan. 24, 2023

(54) LOAD BALANCING METHOD AND NETWORK ELEMENT

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 17/206,558

(22) Filed: Mar. 19, 2021

(65) Prior Publication Data

US 2021/0211904 A1 Jul. 8, 2021

Related U.S. Application Data

(63) Continuation of application No. PCT/CN2019/106123, filed on Sep. 17, 2019.

(30) Foreign Application Priority Data

Sep. 21, 2018 (CN) .......................... 201811109954.0
May 6, 2019 (CN) .......................... 201910373236.2

(51) Int. Cl.
*H04W 4/00* (2018.01)
*H04W 24/04* (2009.01)
(Continued)

(52) U.S. Cl.
CPC ............. *H04W 24/04* (2013.01); *H04W 8/08* (2013.01); *H04W 28/08* (2013.01); *H04W 48/18* (2013.01)

(58) Field of Classification Search
CPC ....... H04W 24/04; H04W 8/08; H04W 28/08; H04W 48/18; H04W 28/0842
(Continued)

(56) References Cited

U.S. PATENT DOCUMENTS

2003/0021252 A1  1/2003 Harper et al.
2004/0006622 A1*  1/2004 Burkes ................ H04L 67/1001
709/227
(Continued)

FOREIGN PATENT DOCUMENTS

CN  1572120 A  1/2005
CN  101499919 A  8/2009
(Continued)

OTHER PUBLICATIONS

Ericsson, et al., "PCF Discovery and Selection," SA WG2 Meeting #122bis, S2-176710, Aug. 21-25, 2017, 7 pages.
(Continued)

*Primary Examiner* — Huy C Ho
(74) *Attorney, Agent, or Firm* — Conley Rose, P.C.

(57) ABSTRACT

A binding support method, includes receiving third information from the source policy control network element, wherein the third information comprises session information of a policy session and an identifier of a policy control network element set to which the source policy control network element belongs, receiving a first request message from an application network element to query a target policy control network element that serves the policy session, the first request message comprises the session information of the policy session, the session information of the policy session is used to indicate the policy session, and determining the target policy control network element based on the third information and the first request message.

20 Claims, 8 Drawing Sheets

(51) Int. Cl.
*H04W 8/08* (2009.01)
*H04W 28/08* (2009.01)
*H04W 48/18* (2009.01)

(58) Field of Classification Search
USPC .......................................................... 370/328
See application file for complete search history.

(56) References Cited

U.S. PATENT DOCUMENTS

| | | | |
|---|---|---|---|
| 2010/0235519 A1* | 9/2010 | Hu | H04M 15/64 709/227 |
| 2011/0165901 A1 | 7/2011 | Baniel et al. | |
| 2016/0344817 A1* | 11/2016 | Renzullo | H04W 4/24 |
| 2019/0158408 A1 | 5/2019 | Li et al. | |

FOREIGN PATENT DOCUMENTS

| | | |
|---|---|---|
| CN | 101541100 A | 9/2009 |
| CN | 101998515 A | 3/2011 |
| CN | 102238645 A | 11/2011 |
| CN | 103107958 A | 5/2013 |
| CN | 103369626 A | 10/2013 |
| CN | 104254140 A | 12/2014 |
| CN | 111373774 A | 7/2020 |
| EP | 2206287 B1 | 2/2012 |
| EP | 2779718 A1 | 9/2014 |
| EP | 3139553 A1 | 3/2017 |
| WO | 2018152031 A1 | 8/2018 |

OTHER PUBLICATIONS

Vodafone, et al., "23.503 PCC in 5G," SA WG2 Meeting #123, S2-176954, Oct. 23-27, 2017, Ljubljana, Slovenia, 14 pages.
Ericsson, "Clarifications on Nudr interactions between PCF and UDR," 3GPP TSG-SA2 Meeting #127, S2-184570, Apr. 16-20, 2018, 17 pages.
Zte, "BSF procedures over Rx," 3GPP TSG-CT WG3 Meeting #97Bis, C3-184168, Sophia Antipolis, France, Jul. 9-13, 2018, 10 pages.
3GPP TS 23.501 V15.3.0, "3rd Generation Partnership Project; Technical Specification Group Services and System Aspects; System Architecture for the 5G System; Stage 2 (Release 15)," Sep. 2018, 226 pages.
3GPP TS 23.502 V15.3.0 "3rd Generation Partnership Project; Technical Specification Group Services and System Aspects; Procedures for the 5G System; Stage 2 (Release 15)," Sep. 2018, 329 pages.
3GPP TS 23.503 V15.3.0 "3rd Generation Partnership Project;Technical Specification Group Services and System Aspects; Policy and Charging Control Framework for the 5G System; Stage 2 (Release 15)," Sep. 2018, 69 pages.
3GPP TS 29.501 V15.0.1 "3rd Generation Partnership Project; Technical Specification Group Core Network and Terminals;5 G System; Principles and Guidelines for Services Definition; Stage 3 (Release 15)," Jul. 2018, 55 pages.
3GPP TR 29.816 V1.2.0 "3rd Generation Partnership Project; Technical Specification Group Core Network and Terminals; Study on PCRF failure and restoration (Release 9)," Sep. 2010, 65 pages.
Zte, "Clarification on BSF," 3GPP TSG-CT WG3 Meeting #97, C3-183530, Osaka, Japan, May 21-25, 2018, 4 pages.
Zte et al., "Slice info considered in session binding and PCF selection," 3GPP TSG-CT WG3 Meeting #97Bis, C3-184172, Sophia Antipolis, France, Jul. 9-13, 2018, 3 pages.
Huawei, et al., "PCF Discovery and Selection," SA WG2 Meeting #122, S2-174481, Jun. 26-30, 2017, Cabo, Mexico, 3 pages.

* cited by examiner

LOAD BALANCING METHOD AND NETWORK ELEMENT

CROSS-REFERENCE TO RELATED APPLICATIONS

This application is a continuation of International Patent Application No. PCT/CN2019/106123 filed on Sep. 17, 2019, which claims priority to Chinese Patent Application No. 201811109954.0 filed on Sep. 21, 2018, and priority to Chinese Patent Application No. 201910373236.2 filed on May 6, 2019. All of the aforementioned patent applications are hereby incorporated by reference in their entireties.

TECHNICAL FIELD

This application relates to the communications field, and more specifically, to a load balancing method and a network element.

BACKGROUND

An existing 5th generation (5G) standard supports only load balancing between access and mobility management function (AMF) network elements, but temporarily does not support load balancing between policy control function (PCF) network elements. Therefore, how to implement load balancing between the PCF network elements becomes an urgent problem to be resolved.

SUMMARY

This application provides a load balancing method and a network element, to implement load balancing between policy control network elements.

According to a first aspect, a load balancing method is provided, including after an application network element fails to send a message related to a policy session to a source policy control network element, the application network element sends a first request message to a binding support network element, where the first request message is used to query a target policy control network element that serves the policy session, the first request message includes a policy session group identifier of the policy session and/or session information of the policy session, the policy session group identifier of the policy session is used to indicate a policy session group to which the policy session belongs, and the session information of the policy session is used to indicate the policy session. The application network element receives a first answer message sent by the binding support network element, where the first answer message carries a first identifier, and the first identifier is an identifier of the target policy control network element. The message related to the policy session includes information that the application network element requests the source policy control network element to authorize and that is related to the policy session. The target policy control network element and the source policy control network element belong to a same policy control network element set.

According to the load balancing method provided in this embodiment of this application, after failing to send the message related to the policy session, the application network element sends the first request message to the binding support network element. The first request message carries the policy session group identifier of the policy session and/or the session information of the policy session, to query the target policy control network element that serves the policy session, so that the application network element may send the message related to the policy session to the target policy control network element. In this way, after failing to send the message related to the policy session, the application network element may send the message related to the policy session to the target policy control network element. This implements load balancing between policy control network elements.

With reference to the first aspect, in some implementations of the first aspect, the first request message includes indication information, and the indication information is used to indicate that the application network element fails to send the message related to the policy session to the source policy control network element.

According to the load balancing method provided in this embodiment of this application, the indication information indicating that the application network element fails to send the message related to the policy session to the source policy control network element is carried in the first request message sent by the application network element to the binding support network element. In this way, in a process of implementing load balancing between the policy control network elements, the binding support network element does not need to subscribe to status change information of the source policy control network element. This reduces complexity of the binding support network element.

With reference to the first aspect, in some implementations of the first aspect, before the application network element sends the first request message to the binding support network element, if the application network element receives first information sent by the source policy control network element, the first information includes the policy session group identifier of the policy session.

According to the load balancing method provided in this embodiment of this application, when the application network element has established communication with the source policy control network element before sending the first request message to the binding support network element, and when the application network element receives the policy session group identifier of the policy session from the source policy control network element, the first request message may further include the policy session group identifier of the policy session. This can reduce a difficulty of obtaining the target policy control network element by the binding support network element.

With reference to the first aspect and the foregoing implementations of the first aspect, in another implementation of the first aspect, the policy session group identifier includes at least an identifier of the policy control network element set.

According to the load balancing method provided in this embodiment of this application, the policy session group identifier should include at least the identifier of the policy control network element set. In this way, the policy control network element set can be determined based on the policy session group identifier.

With reference to the first aspect and the foregoing implementations of the first aspect, in another implementation of the first aspect, after the application network element sends the message related to the policy session to the source policy control network element, if the application network element receives a second answer message sent by the source policy control network element, where the second answer message includes second information, the first request message further includes the second information. The second information is used to indicate a reason why the application network element fails to send the message related to the policy session to the source policy control network element.

With reference to the first aspect and the foregoing implementations of the first aspect, in another implementation of the first aspect, if the application network element does not support a service-based interface, the application network element sends a session establishment request to the target policy control network element. The session establishment request includes a session identifier of a session established by the application network element for the source policy control network element, and the session identifier is used by the target policy control network element to determine a context of the session that is established for the source policy control network element and that is associated with the session establishment request.

It should be understood that the session is an Rx interface session, and the session identifier is an Rx interface session identifier.

It should be understood that the target policy control network element may process the session establishment request based on the context of the established session.

According to the load balancing method provided in this embodiment of this application, when receiving, from the source policy control network element, the reason why the message related to the policy session fails to be sent, the application network element sends the first request message carrying the reason to the binding support network element. This can indicate a status of the source policy control network element to the binding support network element.

It should be understood that the policy control network element may be replaced with a policy service.

According to a second aspect, a load balancing method is provided, including a binding support network element receives a first request message sent by an application network element, where the first request message is used to query a target policy control network element that serves a policy session, the first request message includes a policy session group identifier of the policy session and/or session information of the policy session, the policy session group identifier of the policy session is used to indicate a policy session group to which the policy session belongs, and the session information of the policy session is used to indicate the policy session. The binding support network element determines the target policy control network element based on the first request message, where the policy session group identifier of the policy session is used to indicate the policy session group to which the policy session belongs. The binding support network element sends a first answer message to the application network element, where the first answer message carries a first identifier, and the first identifier is an identifier of the target policy control network element.

According to the load balancing method provided in this embodiment of this application, the binding support network element receives the first request message sent by the application network element, where the first request message includes the policy session group identifier of the policy session and/or the session information of the policy session. The binding support network element obtains the policy session group identifier of the policy session based on the first request message, and determines the target policy control network element based on the policy session group identifier. In this way, there is no need to subscribe to status change information of a source policy control network element that serves the policy session in a policy control network element set. This can reduce complexity of the binding support network element.

With reference to the second aspect, in some implementations of the second aspect, the determining, by the binding support network element, the target policy control network element based on the first request message includes, when the first request message includes the policy session group identifier of the policy session, the binding support network element queries a network storage network element based on the policy session group identifier to determine the identifier of the target policy control network element, or when the first request message includes the session information of the policy session, the binding support network element determines the policy session group identifier based on the session information of the policy session, and queries a network storage network element based on the policy session group identifier to determine the identifier of the target policy control network element.

According to the load balancing method provided in this embodiment of this application, the binding support network element may query the network storage network element based on the policy session group identifier to obtain the identifier of the target policy control network element. Alternatively, the binding support network element may determine the policy session group identifier based on the session information of the policy session, and then queries the network storage network element based on the policy session group identifier to obtain the identifier of the target policy control network element. Different methods are provided for the binding support network element to obtain the identifier of the target policy control network element. This improves flexibility of the binding support network element in obtaining the identifier of the target policy control network element.

With reference to the second aspect and the foregoing implementations of the second aspect, in another implementation of the second aspect, the querying a network storage network element based on the policy session group identifier to obtain the identifier of the target policy control network element includes the network storage network element stores a mapping relationship between the identifier of the target policy control network element and the policy session group identifier.

According to the load balancing method provided in this embodiment of this application, the network storage network element stores the mapping relationship between the identifier of the target policy control network element and the policy session group identifier. In this way, the binding support network may query the network storage network element based on the policy session group identifier to obtain the identifier of the target policy control network element.

With reference to the second aspect and the foregoing implementations of the second aspect, in another implementation of the second aspect, when the policy session is established by the source policy control network element, the method further includes the binding support network element receives third information from the source policy control network element, where the third information includes the session information of the policy session and the policy session group identifier of the policy session, and the target policy control network element and the source policy control network element belong to the same policy control network element set.

According to the load balancing method provided in this embodiment of this application, when establishing the policy session, the source policy control network element may register related information of the policy session with the binding support network element. In this way, the binding support network element can easily determine, based on the related information of the policy session, a policy control network element that serves the policy session.

With reference to the second aspect and the foregoing implementations of the second aspect, in another implementation of the second aspect, the first request message includes indication information, and the indication information is used to indicate that the application network element fails to send a message related to the policy session to the source policy control network element. The binding support network element determines, based on the indication information, that the source policy control network element no longer serves the policy session.

According to the load balancing method provided in this embodiment of this application, the first request message includes the indication information used to indicate that the application network element fails to send the message related to the policy session to the source policy control network element. In this way, the binding support network element can easily determine that the source policy control network element no longer serves the policy session.

With reference to the second aspect and the foregoing implementations of the second aspect, in another implementation of the second aspect, the policy session group identifier includes at least an identifier of the policy control network element set to which the source policy control network element or the target policy control network element belongs.

According to the load balancing method provided in this embodiment of this application, the policy session group identifier should include at least the identifier of the policy control network element set. In this way, the policy control network element set can be determined based on the policy session group identifier.

According to a third aspect, a load balancing method is provided, including a source policy control network element establishes a policy session, where the policy session is served by the source policy control network element. The source policy control network element sends third information to a binding support network element. The third information includes session information of the policy session and a policy session group identifier of the policy session, the session information of the policy session is used to indicate the policy session, and the policy session group identifier of the policy session is used to indicate a policy session group to which the policy session belongs. According to the load balancing method provided in this embodiment of this application, when establishing the policy session, the source policy control network element registers related information of the policy session (for example, the session information of the policy session, the policy session group identifier of the policy session, and an identifier of a policy control network element that serves the policy session) with the binding support network element. In this way, the binding support network element can easily determine the policy control network element that serves the policy session.

With reference to the third aspect, in some implementations of the third aspect, when the policy session is no longer served by the source policy control network element, the method further includes the source policy control network element refuses to receive a message that is related to the policy session and that is sent by an application network element.

According to the load balancing method provided in this embodiment of this application, when no longer serving the policy session, the source policy control network element refuses to receive the message that is related to the policy session and that is sent by the application network element. This can indicate, to the application network element, that the source policy control network element can no longer serve the policy session.

With reference to the third aspect and the foregoing implementations of the third aspect, in another implementation of the third aspect, when the source policy control network element establishes communication with the application network element before refusing to receive the message that is related to the policy session and that is sent by the application network element, the method further includes the source policy control network element sends first information to the application network element, where the first information includes the policy session group identifier of the policy session.

According to the load balancing method provided in this embodiment of this application, if the source policy control network element has established communication with the application network element before refusing to receive the message that is related to the policy session and that is sent by the application network element, the source policy control network element sends the policy session group identifier to the application network element. In this way, the application network element may send the policy session group identifier to the binding support network element.

With reference to the third aspect and the foregoing implementations of the third aspect, in another implementation of the third aspect, the policy session group identifier includes at least an identifier of a policy control network element set to which the source policy control network element belongs.

According to the load balancing method provided in this embodiment of this application, the policy session group identifier should include at least the identifier of the policy control network element set. In this way, the policy control network element set can be determined based on the policy session group identifier.

With reference to the third aspect and the foregoing implementations of the third aspect, in another implementation of the third aspect, when the source policy control network element refuses to receive the message that is related to the policy session and that is sent by the application network element, the method further includes the source policy control network element sends a second answer message to the application network element, where the second answer message includes second information, and the second information is used to indicate a reason why the source policy control network element refuses to receive the message that is related to the policy session and that is sent by the application network element.

According to the load balancing method provided in this embodiment of this application, if the source policy control network element sends, to the application network element, the reason why the source policy control network element refuses to receive the message that is related to the policy session and that is sent by the application network element, a status of the source policy control network element can be indicated to the application network element.

With reference to the third aspect and the foregoing implementations of the third aspect, in another implementation of the third aspect, the method further includes the source policy control network element sends fourth information to a network storage network element, where the fourth information includes a mapping relationship between an identifier of a target policy control network element and the policy session group identifier.

According to the load balancing method provided in this embodiment of this application, when no longer serving the policy session, the source policy control network element registers, with the network storage network element, the mapping relationship between the identifier of the target policy control network element that serves the policy session and the policy session group identifier. In this way, the network storage network element can determine, based on the policy session group identifier, the identifier of the target policy control network element that serves the policy session.

According to a fourth aspect, a load balancing method is provided, including after an application network element fails to send a message related to a policy session to a source policy service, the application network element sends a first request message to a binding support network element, where the first request message is used to query a target policy service that serves the policy session, the source policy service belongs to a source policy control network element, the target policy service belongs to a target policy control network element, and the target policy control network element and the source policy control network element belong to a same policy control network element set or are a same policy control network element. The first request message includes a policy session group identifier of the policy session and/or session information of the policy session, the policy session group identifier of the policy session is used to indicate a policy session group to which the policy session belongs, and the session information of the policy session is used to indicate the policy session. The application network element receives a first answer message sent by the binding support network element, where the first answer message carries a first identifier, and the first identifier is an identifier of the target policy service.

According to the load balancing method provided in this embodiment of this application, after failing to send the message related to the policy session, the application network element sends the first request message to the binding support network element. The first request message carries the policy session group identifier of the policy session and/or the session information of the policy session, to query the target policy service that serves the policy session, so that the application network element may send the message related to the policy session to the target policy service. In this way, after failing to send the message related to the policy session, the application network element may send the message related to the policy session to the target policy service. This implements load balancing between policy services.

It should be understood that, in this application, a service, in the source policy control network element, receiving the message that is related to the policy session and that is sent by the application network element is referred to as the source policy service, and this is merely an example and does not constitute any limitation on the protection scope of this application. For example, the source policy service may also be referred to as a first service, a source service, or the like. Likewise, in this application, a service, in the target policy control network element, serving the policy session is referred to as the target policy service, and this also is merely an example and does not constitute any limitation on the protection scope of this application. For example, the target policy service may also be referred to as a second service, a target service, or the like.

It should be further understood that, when the target policy control network element and the source policy control network element in this application are the same policy control network element, a service set included in the policy control network element includes the source policy service and the target policy service.

With reference to the fourth aspect, in some implementations of the fourth aspect, the first request message includes indication information, and the indication information is used to indicate that the application network element fails to send the message related to the policy session to the source policy service.

According to the load balancing method provided in this embodiment of this application, the indication information indicating that the application network element fails to send the message related to the policy session to the source policy service is carried in the first request message sent by the application network element to the binding support network element. In this way, in a process of implementing load balancing between policy control network elements, the binding support network element does not need to subscribe to status change information of the source policy service. This reduces complexity of the binding support network element.

With reference to the fourth aspect, in some implementations of the fourth aspect, before the application network element sends the first request message to the binding support network element, if the application network element receives first information sent by the source policy control network element, the first information includes the policy session group identifier of the policy session.

According to the load balancing method provided in this embodiment of this application, when the application network element has established communication with the source policy control network element before sending the first request message to the binding support network element, and when the application network element receives the policy session group identifier of the policy session from the source policy service, the first request message may further include the policy session group identifier of the policy session. This can reduce a difficulty of obtaining the target policy service by the binding support network element.

With reference to the fourth aspect, in some implementations of the fourth aspect, the policy session group identifier includes at least an identifier of the policy control network element set.

According to the load balancing method provided in this embodiment of this application, the policy session group identifier should include at least the identifier of the policy control network element set. In this way, the policy control network element set can be determined based on the policy session group identifier.

With reference to the fourth aspect, in some implementations of the fourth aspect, after the application network element sends the message related to the policy session to the source policy service, if the application network element receives a second answer message sent by the source policy control network element, where the second answer message includes second information, the first request message further includes the second information, where the second information is used to indicate a reason why the application network element fails to send the message related to the policy session to the source policy service.

According to the load balancing method provided in this embodiment of this application, when receiving, from the source policy control network element, the reason why the message related to the policy session fails to be sent, the application network element sends the first request message carrying the reason to the binding support network element. This can indicate a status of the source policy control network element to the binding support network element.

With reference to the fourth aspect, in some implementations of the fourth aspect, if the application network element does not support a service-based interface, a session establishment request sent by the application network element to the target policy service includes a session identifier of a session established by the application network element for the source policy service. The session identifier is used by the target policy service to determine a context of the session established for the source policy service, to modify the session.

According to the load balancing method provided in this embodiment of this application, when the application network element does not support the service-based interface, the application network element may notify the target policy service of the session identifier of the session established by the application network element for the source policy service.

According to a fifth aspect, a load balancing method is provided, including a binding support network element receives third information from a source policy control network element, where the third information includes session information of a policy session and at least one of an identifier of a source policy service corresponding to the policy session, an identifier of the source policy control network element, an identifier of a policy service set corresponding to the policy session, and an identifier of a policy control network element set corresponding to the policy session, and the session information of the policy session is used to indicate the policy session. The binding support network element receives a first request message from an application network element, where the first request message is used to query a target policy control network element or a target policy service that serves the policy session, and the first request message includes the session information of the policy session. The binding support network element determines the target policy service based on the third information and the first request message.

According to the load balancing method provided in this embodiment of this application, when establishing the policy session, the source policy control network element may register related information of the policy session with the binding support network element. In this way, the binding support network element can easily determine, based on the related information of the policy session, a policy control network element that serves the policy session.

With reference to the fifth aspect, in some implementations of the fifth aspect, the method further includes the binding support network element determines binding indication information, where the binding indication information is used to indicate that the policy session is bound to the source policy service, the source policy control network element to which the source policy service belongs, the policy service set to which the source policy service belongs, or the policy control network element set to which the source policy control network element belongs. That the binding support network element determines the target policy control network element or the target policy service based on the third information and the first request message includes, if the binding indication information corresponding to the policy session in the first request message indicates that the policy session is bound to the source policy service, the binding support network element selects the source policy service or the source policy control network element as the target policy service, or if the source policy service is unavailable, the binding support network element selects, from the source policy control network element, the policy service set, or the policy control network element set, a policy service as the target policy service, or if the source policy control network element is unavailable, the binding support network element selects, from the policy control network element set, another policy control network element or a policy service of another policy control network element as the target policy service, if the binding indication information corresponding to the policy session in the first request message indicates that the policy session is bound to the source policy control network element, the binding support network element selects the source policy service in the source policy control network element or the source policy control network element as the target policy service, or if the source policy control network element is unavailable, the binding support network element selects, from the policy control network element set, another policy control network element or a policy service of another policy control network element as the target policy service, if the binding indication information corresponding to the policy session in the first request message indicates that the policy session is bound to the policy service set, the binding support network element selects, as the target policy service, a policy service from the policy service set in the policy control network element set or a policy control network element from the policy control network element set, or if the binding indication information corresponding to the policy session in the first request message indicates that the policy session is bound to the policy control network element set, the binding support network element selects a policy service or a policy control network element from the policy control network element set, to serve the policy session.

With reference to the fifth aspect and the foregoing implementations of the fifth aspect, in another implementation of the fifth aspect, that the binding support network element determines the binding indication information includes the binding support network element determines the binding indication information based on the third information, or the third information includes the binding indication information.

According to the load balancing method provided in this embodiment of this application, in a possible implementation, the binding support network element may determine the binding indication information based on information included in the received third information, where the binding indication information is implicitly indicated. In another possible implementation, the third information includes the binding indication information, where the binding indication information is explicitly indicated.

With reference to the fifth aspect and the foregoing implementations of the fifth aspect, in another implementation of the fifth aspect, the method further includes the following.

The binding support network element sends identification information of the selected policy service or policy control network element to the application network element, or the binding support network element sends a second request message to the selected policy control network element based on the first request message, where the second request message is used to serve the policy session.

With reference to the fifth aspect and the foregoing implementations of the fifth aspect, in another implementation of the fifth aspect, the method further includes the binding support network element sends the binding indication information to the application network element, so that the application network element adds the binding indication information to a request message when sending the request message to the target policy service or the target policy control network element.

With reference to the fifth aspect and the foregoing implementations of the fifth aspect, in another implementation of the fifth aspect, the method further includes the binding support network element sends identification information of the target policy service to the application network element, or the binding support network element sends a second request message to the target policy service based on the first request message, where the second request message is used to serve the policy session.

With reference to the fifth aspect and the foregoing implementations of the fifth aspect, in another implementation of the fifth aspect, the method further includes the binding support network element determines whether the source policy service or the source policy control network element is available.

With reference to the fifth aspect and the foregoing implementations of the fifth aspect, in another implementation of the fifth aspect, that the binding support network element determines the target policy service based on the third information and the first request message includes when the first request message includes a policy session group identifier of the policy session, the binding support network element queries a network storage network element based on the policy session group identifier to determine an identifier of the target policy service, or when the first request message includes the session information of the policy session, the binding support network element determines a policy session group identifier based on the session information of the policy session, and queries a network storage network element based on the policy session group identifier to determine an identifier of the target policy service.

With reference to the fifth aspect and the foregoing implementations of the fifth aspect, in another implementation of the fifth aspect, the first request message includes indication information, and the indication information is used to indicate that the application network element fails to send a message related to the policy session to the source policy service. The method further includes the binding support network element determines, based on the indication information, that the source policy service no longer serves the policy session.

With reference to the fifth aspect and the foregoing implementations of the fifth aspect, in another implementation of the fifth aspect, the policy session group identifier includes at least an identifier of the policy control network element set to which the source policy service or the target policy service belongs.

According to a sixth aspect, a load balancing method is provided, including a source policy control network element establishes a policy session, where the policy session is served by a policy service of a policy control network element set to which the source policy control network element belongs. The source policy control network element sends third information to a binding support network element, where the third information includes session information of the policy session and at least one of an identifier of a source policy service corresponding to the policy session, an identifier of the source policy control network element, an identifier of a policy service set corresponding to the policy session, and an identifier of the policy control network element set corresponding to the policy session, and the session information of the policy session is used to indicate the policy session.

According to the load balancing method provided in this embodiment of this application, when establishing the policy session, the source policy control network element may register related information of the policy session with the binding support network element. In this way, the binding support network element can easily determine, based on the related information of the policy session, a policy control network element that serves the policy session.

With reference to the sixth aspect, in some implementations of the sixth aspect, the third information further includes binding indication information, or the third information is used to determine binding indication information. The binding indication information is used to indicate that the policy session is bound to the source policy service, the source policy control network element to which the source policy service belongs, the policy service set to which the source policy service belongs, or the policy control network element set to which the source policy control network element belongs.

With reference to the sixth aspect, in some implementations of the sixth aspect, when the policy session is no longer served by the source policy service, the method further includes the source policy control network element refuses to receive a message that is related to the policy session and that is sent by an application network element.

With reference to the sixth aspect, in some implementations of the sixth aspect, when the source policy control network element establishes communication with the application network element before refusing to receive the message that is related to the policy session and that is sent by the application network element, the method further includes the source policy control network element sends first information to the application network element, where the first information includes a policy session group identifier of the policy session.

With reference to the sixth aspect, in some implementations of the sixth aspect, the policy session group identifier includes at least the identifier of the policy control network element set to which the source policy service belongs.

With reference to the sixth aspect, in some implementations of the sixth aspect, when the source policy control network element refuses to receive the message that is related to the policy session and that is sent by the application network element, the method further includes the source policy control network element sends a second answer message to the application network element, where the second answer message includes second information, and the second information is used to indicate a reason why the source policy control network element refuses to receive the message that is related to the policy session and that is sent by the application network element.

According to a seventh aspect, a load balancing method is provided, including an application network element receives, from a binding support network element, at least one of an identifier of a source policy service, an identifier of a source policy control network element, an identifier of a policy service set to which the source policy service belongs, and an identifier of a policy control network element set to which the source policy control network element belongs. After failing to send a message related to a policy session to the source policy service, the application network element selects a target policy service based on at least one of the identifier of the source policy control network element, the identifier of the policy service set to which the source policy service belongs, and the identifier of the policy control network element set to which the source policy control network element belongs, where the target policy service is used to serve the policy session.

According to the load balancing method provided in this embodiment of this application, the application network element receives, from the binding support network element, the at least one of the identifier of the source policy service, the identifier of the source policy control network element, the identifier of the policy service set to which the source policy service belongs, and the identifier of the policy control network element set to which the source policy control network element belongs. After failing to send the message related to the policy session to the source policy service, the application network element may select the target policy service based on the at least one of the identifier of the source policy control network element, the identifier of the policy service set to which the source policy service belongs, and the identifier of the policy control network element set to which the source policy control network element belongs, so that the application network element may send the message related to the policy session to the target policy service. This implements load balancing between policy services.

With reference to the seventh aspect, in some implementations of the seventh aspect, that the application network element selects the target policy service based on the at least one of the identifier of the source policy control network element, the identifier of the policy service set to which the source policy service belongs, and the identifier of the policy control network element set to which the source policy control network element belongs includes the application network element selects, from the policy service set to which the source policy service belongs, a policy service equivalent to the source policy service as the target policy service, selects, from the source policy control network element, a policy service equivalent to the source policy service as the target policy service, or selects, from the policy control network element set, a policy service that is equivalent to the source policy service and that is in another policy control network element as the target policy service.

With reference to the seventh aspect, in some implementations of the seventh aspect, the method further includes the application network element receives binding indication information from the binding support network element, where the binding indication information is used to indicate that the policy session is bound to the source policy service, the source policy control network element in which the source policy service is located, the policy service set to which the source policy service belongs, or the policy control network element set to which the source policy control network element belongs.

The application network element adds the binding indication information to a message when sending the message to the source policy service or the target policy service.

According to an eighth aspect, an application network element is provided. The application network element is configured to perform the load balancing method in any one of the first aspect, the fourth aspect, the seventh aspect, or the possible implementations of the first, the fourth, and the seventh aspects.

Specifically, the application network element may include units configured to perform the load balancing method in any one of the first aspect, the fourth aspect, the seventh aspect, or the possible implementations of the first, the fourth, and the seventh aspects.

According to a ninth aspect, an application network element is provided. The application network element includes a processor and a transceiver. The processor and the transceiver communicate with each other through an internal connection path.

Optionally, the application network element further includes a memory. The memory is configured to store an instruction. The processor is configured to execute the instruction stored in the memory.

In an optional implementation, the processor performs the method in any one of the first aspect, the fourth aspect, the seventh aspect, or the possible implementations of the first, the fourth, and the seventh aspects.

According to a tenth aspect, a computer-readable storage medium is provided. A computer program is stored in the computer-readable storage medium. The program is executed by a processor to implement the method in any one of the first aspect, the fourth aspect, the seventh aspect, or the possible implementations of the first, the fourth, and the seventh aspects.

According to an eleventh aspect, a computer program product is provided. The computer program product includes computer program code. When the computer program code is run by a communications unit, a processing unit, a transceiver, or a processor of an application network element, the application network element is enabled to perform the methods in the first, the fourth, and the seventh aspects.

According to a twelfth aspect, a chip system is provided, including a processor, configured to support an application network element to implement the methods in the first, the fourth, and the seventh aspects.

According to a thirteenth aspect, a binding support network element is provided. The binding support network element is configured to perform the load balancing method in any one of the second aspect, the fifth aspect, or the possible implementations of the second and the fifth aspects.

Specifically, the binding support network element may include units configured to perform the load balancing method in any one of the second aspect, the fifth aspect, or the possible implementations of the second and the fifth aspects.

According to a fourteenth aspect, a binding support network element is provided. The binding support network element includes a processor and a transceiver. The processor and the transceiver communicate with each other through an internal connection path.

Optionally, the binding support network element further includes a memory. The memory is configured to store an instruction. The processor is configured to execute the instruction stored in the memory.

In an optional implementation, the processor performs the method in any one of the second aspect, the fifth aspect, or the possible implementations of the second and the fifth aspects.

According to a fifteenth aspect, a computer-readable storage medium is provided. A computer program is stored in the computer-readable storage medium. The program is executed by a processor to implement the method in any one of the second aspect, the fifth aspect, or the possible implementations of the second and the fifth aspects.

According to a sixteenth aspect, a computer program product is provided. The computer program product includes computer program code. When the computer program code is run by a communications unit, a processing unit, a transceiver, or a processor of a binding support network element, the binding support network element is enabled to perform the methods in the second and the fifth aspects.

According to a seventeenth aspect, a chip system is provided, including a processor, configured to support a binding support network element to implement the methods in the second and the fifth aspects.

According to an eighteenth aspect, a source policy control network element is provided. The source policy control network element is configured to perform the load balancing method in any one of the third aspect, the sixth aspect, or the possible implementations of the third and the sixth aspects.

Specifically, the source policy control network element may include units configured to perform the load balancing method in any one of the third aspect, the sixth aspect, or the possible implementations of the third and the sixth aspects.

According to a nineteenth aspect, a source policy control network element is provided. The source policy control network element includes a processor and a transceiver. The processor and the transceiver communicate with each other through an internal connection path.

Optionally, the source policy control network element further includes a memory. The memory is configured to store an instruction. The processor is configured to execute the instruction stored in the memory.

In an optional implementation, the processor performs the method in any one of the third aspect, the sixth aspect, or the possible implementations of the third and the sixth aspects.

According to a twentieth aspect, a computer-readable storage medium is provided. A computer program is stored in the computer-readable storage medium. The program is executed by a processor to implement the method in any one of the third aspect, the sixth aspect, or the possible implementations of the third and the sixth aspects.

According to a twenty-first aspect, a computer program product is provided. The computer program product includes computer program code. When the computer program code is run by a communications unit, a processing unit, a transceiver, or a processor of a source policy control network element, the source policy control network element is enabled to perform the methods in the third and the sixth aspects.

According to a twenty-second aspect, a chip system is provided, including a processor, configured to support a source policy control network element to implement the methods in the third and the sixth aspects.

According to a twenty-third aspect, a communications system is provided, including one or more of the foregoing application network element, binding support network element, and source policy control network element.

In a possible design, the communications system may further include another device that interacts with the application network element, the binding support network element, or the source policy control network element in the solutions provided in the embodiments of this application, and the like.

According to the load balancing method and the network element that are provided in the embodiments of this application, after failing to send the message related to the policy session to the source policy control network element, the application network element sends the first request message to the binding support network element, to query the target policy control network element. The first request message carries the policy session group identifier of the policy session and/or the session information of the policy session. In this way, after failing to send the message related to the policy session, the application network element may send the message related to the policy session to the target policy control network element. This implements load balancing between policy control network elements in the policy control network element set.

DESCRIPTION OF EMBODIMENTS

The following describes technical solutions of this application with reference to accompanying drawings.

Figure 1:
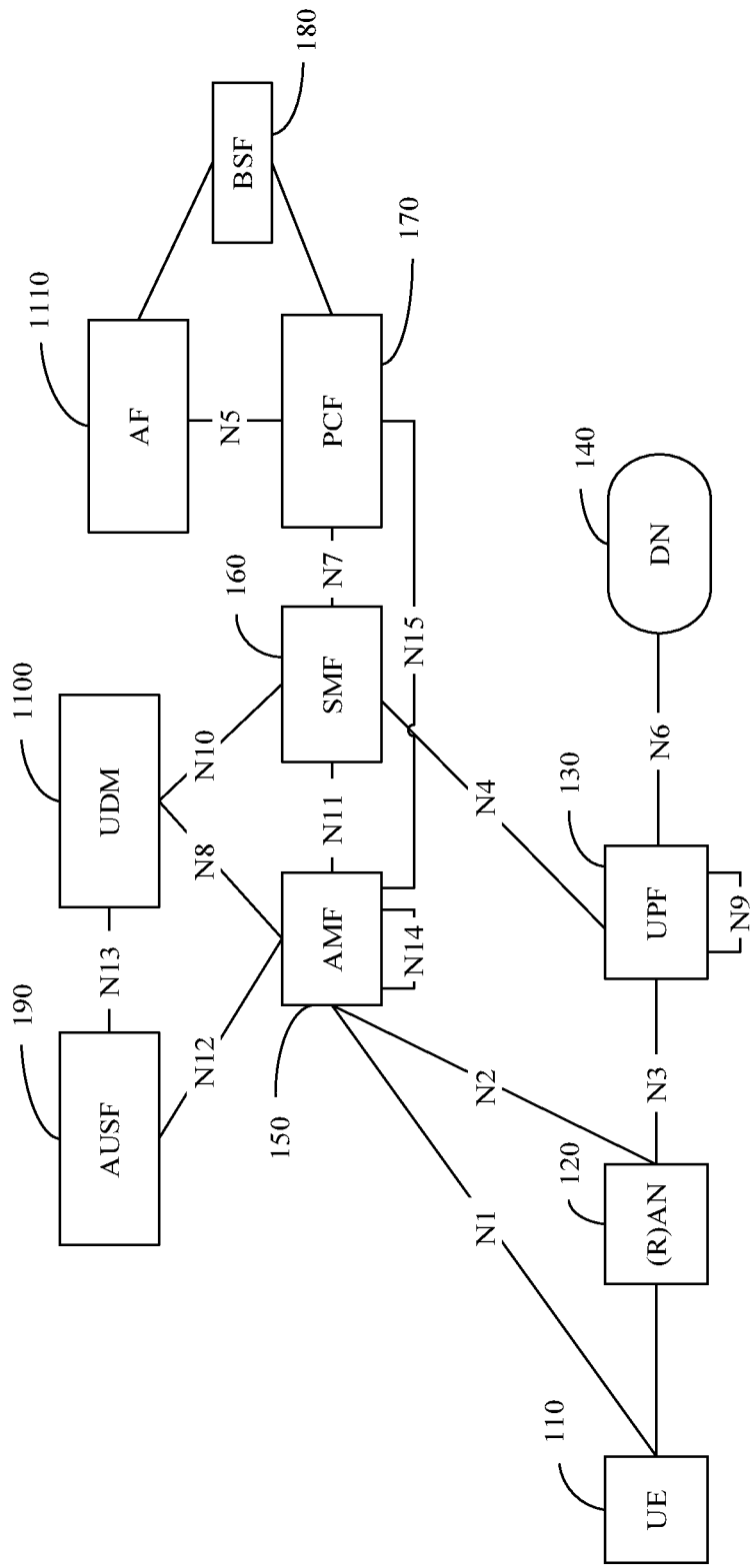
FIG. 1 shows a network architecture applied to embodiments of this application.

FIG. 1 shows a network architecture applied to the embodiments of this application. As shown in FIG. 1, the following separately describes components in the network architecture.

1. A terminal device 110 may include handheld device, vehicle-mounted device, wearable device, computing device that have a wireless communication function, or other processing device connected to a wireless modem, or various forms of terminal, mobile station (MS), terminal, user equipment (UE), soft client, and the like. For example, the terminal device 110 may be a water meter, an electricity meter, or a sensor.

2. A (radio) access network ((R)AN) element 120 is configured to provide a network access function for authorized terminal devices in a specific area, and can use transmission tunnels with different quality based on levels, service requirements, and the like of the terminal devices.

The (R)AN element can manage radio resources and provide an access service for a terminal device, to forward a control signal and terminal device data between the terminal device and a core network. The (R)AN element may also be understood as a base station in a conventional network.

3. A user plane network element 130 is used for packet routing and forwarding, quality of service (QoS) processing of user plane data, and the like.

In a 5G communications system, the user plane network element may be a user plane function (UPF) network element. In a future communications system, the user plane network element may still be a UPF network element, or may have another name. This is not limited in this application.

4. A data network (DN) element 140 is configured to provide a network for data transmission.

In the 5G communications system, the DN element may be a DN element. In the future communications system, the DN element may still be a DN element, or may have another name. This is not limited in this application.

5. An access management network element 150 is mainly configured to perform mobility management, access management, and the like. The access management network element 150 may be configured to implement functions, for example, lawful interception and access authorization/authentication, other than session management in functions of a mobility management entity (MME).

In the 5G communications system, the access management network element may be an AMF network element. In the future communications system, the access management network element may still be an AMF network element, or may have another name. This is not limited in this application.

6. A session management network element 160 is mainly configured to manage a session, assign and manage an Internet Protocol (IP) address of a terminal device, select a UPF and a policy control and charging function, send downlink data notification, and the like.

In the 5G communications system, the session management network element may be a session management function (SMF) network element. In the future communications system, the session management network element may still be an SMF network element, or may have another name. This is not limited in this application.

7. A policy control network element 170 is configured to guide a unified policy framework of network behavior, and provide policy rule information for a control plane function network element (such as the AMF network element or the SMF network element), and the like.

In a 4th generation (4G) communications system, the policy control network element may be a policy and charging rules function (PCRF) network element. In the 5G communications system, the policy control network element may be a PCF network element. In the future communications system, the policy control network element may still be a PCF network element, or may have another name. This is not limited in this application.

8. A binding support network element 180 is configured to search for a PCF associated with a session.

In the 5G communications system, the binding support network element may be a binding support function (BSF) network element. In the future communications system, the binding support network element may still be a BSF network element, or may have another name. This is not limited in this application.

9. An authentication server 190 is configured to authenticate a service, generate a key to implement two-way authentication between the authentication server 190 and a terminal device, and support a unified authentication framework.

In the 5G communications system, the authentication server may be an authentication server function (AUSF) network element. In the future communications system, the authentication server may still be an AUSF network element, or may have another name. This is not limited in this application.

10. A data management network element 1100 is configured to process a terminal device identifier, perform access authentication, registration, and mobility management, and the like.

In the 5G communications system, the data management network element may be a unified data management (UDM) network element. In the future communications system, the data management network element may still be a UDM network element, or may have another name. This is not limited in this application.

11. An application network element is configured to perform application-affected data routing, access a network exposure function network element, interact with a policy framework to perform policy control, and the like.

In the 5G communications system, the application network element may be an application function (AF) network element. In the future communications system, the application network element may still be an AF network element, or may have another name. This is not limited in this application.

12. A network storage network element is configured to maintain real-time information of all network function services in a network.

In the 5G communications system, the network storage network element may be a network repository function (NRF) network element. In the future communications system, the network storage network element may still be an NRF network element, or may have another name. This is not limited in this application.

It may be understood that the foregoing network elements or functions may be network elements in a hardware device, software functions running on dedicated hardware, or virtualized functions instantiated on a platform (for example, a cloud platform).

For ease of description, this application is described below by using an example in which the application network element is the AF network element, the binding support network element is the BSF network element, the network storage network element is the NRF network element, and the policy control network element is the PCF network element.

Further, the AF network element is referred to as an AF for short, the BSF network element is referred to as a BSF for short, the NRF network element is referred to as an NRF for short, and the PCF network element is referred to as a PCF for short. In other words, in the following descriptions of this application, the AF may be replaced with the application network element, the BSF may be replaced with the binding support network element, the NRF may be replaced with the network storage network element, and the PCF may be replaced with the policy control network element.

For ease of description, in this application, a load balancing method is described by using an example in which an apparatus is an AF entity, a BSF entity, or a PCF entity. For an implementation method in which the apparatus is a chip in an AF entity, a chip in a BSF entity, or a chip in a PCF entity, refer to specific descriptions about the load balancing method in which the apparatus is the AF entity, the BSF entity, or the PCF entity. Details are not repeated.

In the network architecture shown in FIG. 1, the terminal device is connected to the AMF through an N1 interface, the RAN is connected to the AMF through an N2 interface, and the RAN is connected to the UPF through an N3 interface.

UPFs are connected to each other through an N9 interface, and the UPF is interconnected to a DN through an N6 interface.

The SMF controls the UPF through an N4 interface. The AMF is connected to the SMF through an N11 interface.

The AMF obtains subscription data of the terminal device from a UDM unit through an N8 interface. The SMF obtains the subscription data of the terminal device from the UDM unit through an N10 interface.

The AMF obtains policy data from the PCF through an N15 interface. The SMF obtains the policy data from the PCF through an N7 interface.

The AF and the PCF are connected through an N5 interface.

In addition, the AF and the PCF each are connected to the BSF. When the SMF triggers establishment of a policy session, the PCF registers, with the BSF, session information of the policy session and an identifier of a PCF corresponding to the policy session. In this case, the AF may query, from the BSF based on the session information corresponding to the policy session, the identifier of the PCF corresponding to the policy session. In this way, the SMF and the AF select a same PCF for a same session.

It should be understood that the foregoing network architecture applied to the embodiments of this application is merely an example, and a network architecture applicable to the embodiments of this application is not limited thereto. Any network architecture that can implement functions of the foregoing network elements is applicable to the embodiments of this application.

For example, in some network architectures, network function network elements and entities such as the AMF network element, the SMF network element, the PCF network element, the BSF network element, and the UDM network element are all referred to as network function (NF) network elements. Alternatively, in some other network architectures, a set of network elements such as the AMF network element, the SMF network element, the PCF network element, the BSF network element, and the UDM network element may be referred to as a control plane function network element.

The technical solutions of the embodiments of this application may be applied to various communications systems, such as a global system for mobile communications (GSM), a code division multiple access (CDMA) system, a wideband CDMA (WCDMA) system, a general packet radio service (GPRS) system, a Long-Term Evolution (LTE) system, an LTE frequency-division duplex (FDD) system, an LTE time-division duplex (TDD) system, a universal mobile telecommunications system (UMTS), a Worldwide Interoperability for Microwave Access (WiMAX) communications system, a future 5G system, or a New Radio (NR) system.

The terminal device in the embodiments of this application may be UE, an access terminal, a subscriber unit, a subscriber station, a MS, a mobile console, a remote station, a remote terminal, a mobile device, a user terminal, a terminal, a wireless communications device, a user agent, a user apparatus, or the like. The terminal device may alternatively be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the GSM or the CDMA system, may be a NodeB (NB) in the WCDMA system, may be an evolved NB (eNB) in the LTE system, or may be a radio controller in a scenario of a cloud RAN (CRAN). Alternatively, the network device may be a relay station, an access point, a vehicle-mounted device, a wearable device, a network device in the future 5G network, a network device in the future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing by using a process, for example, a LINUX operating system, a UNIX operating system, an ANDROID operating system, an IOS operating system, or a WINDOWS operating system. The application layer includes applications such as a browser, an address book, word processing software, and instant communications software. In addition, a specific structure of an entity for performing a method provided in the embodiments of this application is not particularly limited in the embodiments of this application, provided that a program recording code of the method provided in the embodiments of this application can be run to perform communication according to the method provided in the embodiments of this application. For example, the entity for performing the method provided in the embodiments of this application may be the terminal device or the network device, or may be a functional module capable of invoking and executing the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

A plurality of methods that can be implemented by the foregoing network elements include a load balancing method. An existing 5G standard supports only load balancing between AMFs is supported, but temporarily does not support load balancing between PCFs.

A method for load balancing between AMFs is as follows.

Each AMF has one or more globally unique AMF identifiers (GUAMI), and terminal devices served by the AMF are grouped based on the GUAMI.

When load of an AMF needs to be balanced, a terminal device belonging to one or more GUAMI groups is migrated out of the AMF (in other words, the migrated terminal device is no longer served by the AMF).

Further, the AMF sends a notification message to a neighboring network element of the AMF, to notify the neighboring network element of the AMF that the terminal device belonging to the one or more GUAMI groups is no longer served by the AMF.

Optionally, the AMF may specify a target AMF serving the terminal device belonging to the one or more GUAMI groups.

When the method for load balancing between AMFs is applied to load balancing between PCFs, specific implementation is as follows.

A PCF set is established, where the PCF set includes a plurality of PCFs. In addition, all the PCFs in the PCF set have a same capability, but may have different capacities.

Each PCF in the PCF set has one or more policy session group identifiers. When establishing a session, a PCF selects a policy session group identifier for the session, and sends the policy session group identifier to a peer network element (for example, an AMF or a PCF).

The policy session group identifier may be an identifier of the PCF set. In this case, all policy sessions served by the PCF set are in one policy session group.

Alternatively, the policy session group identifier consists of an identifier of the PCF set and a PCF pointer. One or more PCF pointers may be configured for one PCF in the PCF set.

When one PCF pointer is configured for one PCF, the PCF pointer may be set as an identifier of the PCF. In this case, all policy sessions served by one PCF are in one policy session group. In this case, the policy session group identifier consists of an identifier of a PCF set to which the PCF belongs and the PCF pointer.

When a plurality of PCF pointers are configured for one PCF, policy sessions served by the PCF are divided into a plurality of policy session groups. One pointer is configured for each policy session group. In this case, the policy session group identifier consists of an identifier of a PCF set to which the PCF belongs and one of the plurality of pointers configured for the PCF. In this case, some policy sessions in one PCF may be migrated to another PCF in the PCF set, to implement load balancing more flexibly.

When load needs to be rebalanced in a PCF (source PCF) set, a source PCF sends a session context of a policy session group that needs to be served by another PCF to an unstructured data storage function (UDSF) or a target PCF corresponding to the policy session group.

A PCF that originally serves the policy session group is referred to as the source PCF, and a PCF that serves the policy session group migrated out of the source PCF is referred to as the target PCF.

In addition, the source PCF notifies an NRF network element of deleting the policy session group from a list of policy session groups served by the source PCF.

If the target PCF corresponding to the policy session group is determined, the target PCF notifies the NRF of adding the policy session group to a list of policy session groups served by the target PCF.

Optionally, the source PCF notifies another network element that the policy session group is no longer served by the source PCF.

If the target PCF of the policy session group is determined, a notification message may further include information of the target PCF corresponding to the policy session group.

It should be understood that, when a policy session is established for the first time, a PCF registers related information of the policy session with a BSF. The related information of the policy session includes session information of the policy session, for example, an IP address of the session, a DN name (DNN) of the session, single-network slice selection assistance information (S-NSSAI), a terminal device identifier of the session, and an application identifier of the session, and an identifier of a PCF serving the policy session.

Based on the session information of the policy session and the identifier of the PCF of the policy session, an AF can find, based on the related information of the policy session, the PCF corresponding to the policy session.

When the method for load balancing between AMFs that is supported in the existing 5G standard is directly applied to load balancing between PCFs, the following problem is caused.

The BSF stores only the session information of the policy session and the identifier of the PCF of the policy session. The BSF does not check whether the PCF of the policy session can serve the policy session.

Therefore, the BSF only returns the identifier of the PCF of the policy session to the AF based on the stored information when the AF initiates a query.

Therefore, the BSF may not know that the policy session is no longer served by the PCF indicated by the identifier of the PCF of the policy session.

In this case, the AF finds that the PCF indicated by the identifier of the PCF of the policy session cannot serve the policy session. However, the BSF still sends the PCF to the AF. Consequently, the AF cannot find a target PCF that can serve the policy session.

To resolve this problem, an embodiment of this application provides a solution for load balancing between PCFs.

Figure 2:
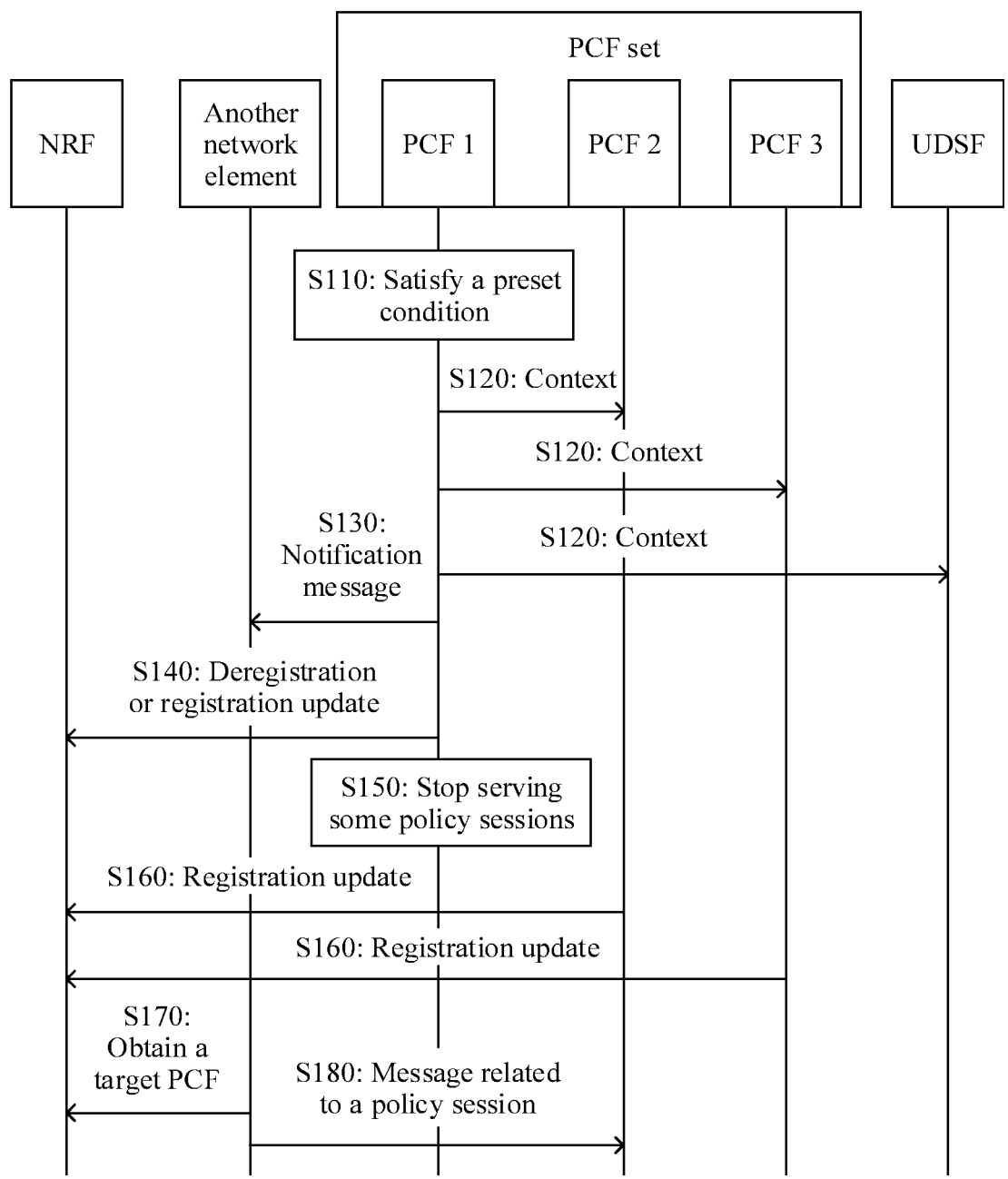
FIG. 2 is a schematic diagram of a method for load balancing between PCFs according to this application.

The following describes the solution for load balancing between PCFs in detail with reference to FIG. 2.

FIG. 2 is a schematic diagram of a method for load balancing between PCFs according to this application.

As described above, one PCF set consists of a plurality of PCFs.

For example, a PCF set shown in FIG. 2 consists of a PCF 1, a PCF 2, and a PCF 3. All the PCFs in the PCF set have a same capability.

A network device configures one or more policy session group identifiers for each PCF in the PCF set.

For example, as shown in Table 1, policy session group identifiers 000 and 001 are configured for the PCF 1, policy session group identifiers 010 and 011 are configured for the PCF 2, and policy session group identifiers 100 and 101 are configured for the PCF 3.

TABLE 1

| PCF | Policy session group identifier |
| --- | --- |
| PCF 1 | 000 |
|  | 001 |
| PCF 2 | 010 |
|  | 011 |

TABLE 1-continued

| PCF | Policy session group identifier |
| --- | --- |
| PCF 3 | 100 |
| | 101 |

When creating a policy session, any PCF in the PCF set selects, as a policy session group identifier of the policy session, any one of policy session group identifiers configured for the PCF. In addition, the PCF sends the policy session group identifier corresponding to the policy session to another network element (for example, an AMF or an SMF).

FIG. 2 shows a process of load balancing between PCFs.

During system initialization, a backup target PCF may be determined for each policy session group served by all the PCFs in the PCF set.

For example, a backup target PCF corresponding to a policy session group 000 served by the PCF 1 is the PCF 2, and a backup target PCF corresponding to a policy session group 001 served by the PCF 1 is the PCF 3.

During system initialization, a correspondence between a policy session group and a backup target PCF may be configured in another related network element (for example, the AMF, an NRF, or the SMF), or a PCF sends the correspondence to the another related network element through inter-node signaling.

After system startup, the PCF synchronizes a session context in a policy session group to a backup target PCF corresponding to the policy session group or to a UDSF.

S110. The PCF 1 satisfies a preset condition. That the preset condition is satisfied means that the PCF 1 cannot continue to serve some policy sessions.

For example, the preset condition may be any one of the following the PCF 1 is ready to be powered off, the PCF 1 is scaled in, or the PCF 1 is faulty.

It should be understood that the some policy sessions may be some of policy sessions served by the PCF 1. One policy session corresponds to one protocol data unit (PDU) session of one terminal device.

Specifically, that the PCF 1 is ready to be powered off may be determining, based on a network status (busy or idle) of a communications system, whether some PCFs in the PCF set need to be powered off.

For example, when the network status of the communications system is idle, one or more PCFs in the PCF set may be powered off. In other words, the PCF 1 may be powered off.

Alternatively, when the PCF 1 is upgraded or maintained, the PCF 1 may need to be powered off.

Specifically, that the PCF 1 is scaled in may be a capacity of a PCF, for example, the PCF 1, in the PCF set can be reduced.

Specifically, that the PCF 1 is faulty may be a hardware fault or a software fault occurs, and the PCF 1 cannot continue to work.

For ease of description, the foregoing "some policy sessions" are referred to as a "policy session" below.

It should be understood that the "policy session" in this embodiment of this application is merely an example, and does not constitute any limitation on this application. Load balancing between PCFs in this application may be balancing any form of content carried on PCFs, and is not limited to a session, a policy session, or the like.

S120. The PCF 1 copies a policy session context to target PCF(s) or the UDSF.

If the PCF 1 does not synchronize in time a policy session context corresponding to a policy session group that is served by the PCF 1 and is to be migrated out of the PCF 1, to the UDSF or backup target PCF(s) corresponding to the policy session group, the PCF 1 copies, to the target PCF(s) or the UDSF, the policy session context corresponding to the policy session group to be migrated out of the PCF 1.

For example, as described above, the backup target PCF corresponding to the policy session group 000 served by the PCF 1 is the PCF 2, and the backup target PCF corresponding to the policy session group 001 served by the PCF 1 is the PCF 3.

In this case, the PCF 1 copies, to the target PCF 2, a policy session context corresponding to the policy session group 000 to be migrated out of the PCF 1.

The PCF 1 copies, to the target PCF 3, a policy session context corresponding to the policy session group 001 to be migrated out of the PCF 1.

If the UDSF is used to back up a policy session context corresponding to a policy session group, the PCF 1 copies, to the UDSF, the policy session contexts of the policy session group 000 and the policy session group 001 that are to be migrated out of the PCF 1.

S130. The PCF 1 sends a notification message to another network element.

If the another network element subscribes to a status change notification of the PCF1 from the PCF 1, the PCF 1 sends the notification message to the another network element. The notification message carries a policy session group identifier. The notification message is used to notify the another network element that the PCF 1 no longer serves the policy session group.

Optionally, the PCF 1 may further add information of the target PCF(s) corresponding to the policy session group to the notification message.

S140. The PCF 1 sends a deregistration request or a registration update request message to the NRF.

For example, if the policy session group 001 is no longer served by the PCF 1, the PCF 1 sends a registration update request message to the NRF, to notify the NRF of deleting the policy session group 001 from a list of policy session groups served by the PCF 1. Alternatively, when the PCF 1 is ready to be powered off, the PCF 1 sends a deregistration request to the NRF, to indicate the NRF not to select the PCF 1 any longer during subsequent PCF selection.

S150. The PCF 1 stops serving some policy sessions.

For example, when the PCF 1 is powered off, scaled in, or faulty, the PCF 1 stops serving the policy session group 001.

S160. The target PCF(s) separately sends an update request to the NRF.

If a target PCF corresponding to a policy session group is determined, the target PCF corresponding to the policy session group sends an update request to the NRF, to register, as being served by the target PCF, an identifier of the policy session group migrated to the target PCF. Subsequently, when the another network element queries the corresponding PCF based on the identifier of the policy session group, the NRF selects the target PCF, and sends information of the target PCF to the another network element.

For example, the PCF 2 sends an update request to the NRF, to register the policy session group 000 as being served by the PCF 2. Subsequently, when the another network element selects a PCF based on the policy session group 000, the NRF selects the PCF 2, and sends information of the PCF 2 to the network element.

S170. The another network element obtains the target PCF.

If the another network element needs to send a message related to a policy session to a PCF, when the another network element finds that the policy session is originally served by the PCF 1 and the PCF 1 currently cannot serve the policy session, the another network element selects a target PCF for the policy session.

A method used by the another network element to find that the PCF 1 cannot serve the policy session includes the another network element receives the notification message described in S130, and the another network element determines, based on the notification message, that the PCF 1 no longer serves the policy session, the another network element sends the message related to the policy session to the PCF 1, and the another network element does not receive a response from the PCF 1, or the another network element sends the message related to the policy session to the PCF 1, and the another network element receives a rejection or redirection response message from the PCF 1.

When the another network element finds that the PCF 1 cannot serve the policy session, a method used by the another network element to select the target PCF includes, if the another network element receives the notification message described in S130, and a target PCF corresponding to a policy session group is specified in the notification message, the another network element determines, based on the policy session group corresponding to the policy session and the notification message, the target PCF corresponding to the policy session, the another network element queries the NRF for the target PCF, and provides the NRF with a policy session group identifier corresponding to the policy session, and the NRF determines the target PCF based on the policy session group identifier, the another network element queries the NRF for the target PCF, and provides the NRF with an identifier of the PCF set, and the NRF selects one PCF from the PCF set as the target PCF, or the another network element receives the redirection response message from the PCF 1, where the response message carries information of the target PCF, and the another network element determines the target PCF based on the information of the target PCF in the response message.

It should be understood that the another network element receives the rejection or redirection response message from the PCF 1 in S170 only when, in S110, the PCF 1 satisfies the preset condition that the PCF 1 is scaled in. When the PCF 1 is powered off or the PCF 1 is faulty, the PCF 1 cannot respond to a received message.

S180. The another network element sends the message related to the policy session to the target PCF.

The another network element may be the BSF described above. According to the method for load balancing between PCFs shown in FIG. 2, the BSF needs to subscribe to a status change notification message of each PCF in the PCF set.

When the PCF is powered off, scaled in, or faulty, the BSF receives a status change notification of the PCF. The status change notification includes information of a policy session group identifier, to indicate the BSF that a policy session group identified by the policy session group identifier is no longer served by the source PCF. When the BSF needs to subscribe to status change notification information of the PCF, the BSF becomes more complex.

Further, this application provides another load balancing method, to implement load balancing between PCFs.

Figure 3:
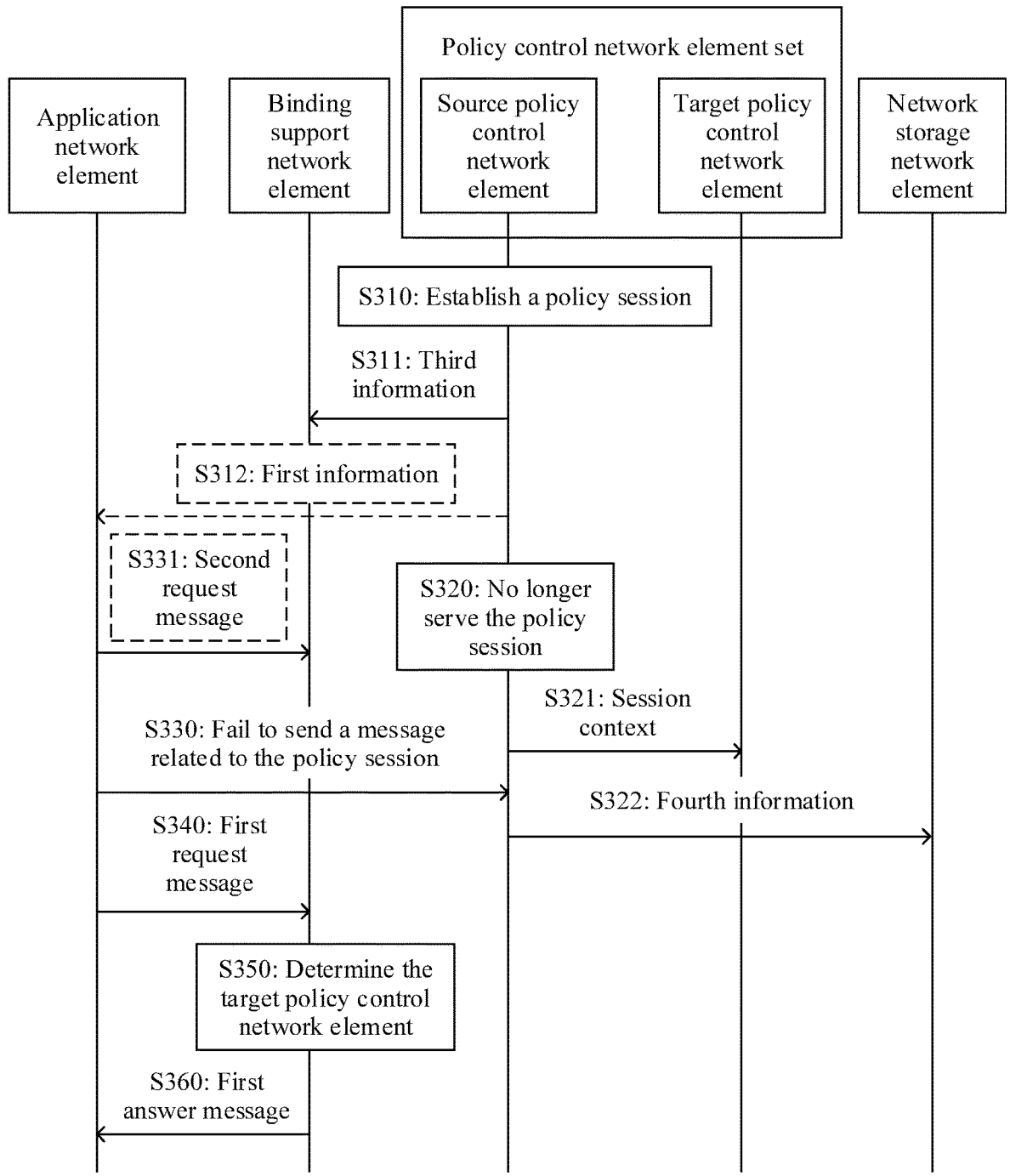
FIG. 3 is a schematic diagram of another load balancing method according to this application.

The following describes the load balancing method in detail with reference to FIG. 3.

FIG. 3 is a schematic diagram of a load balancing method according to this application. The method includes an application network element, a binding support network element, a source policy control network element, a target policy control network element, and a network storage network element. The source policy control network element and the target policy control network element are two different policy control network elements in a same policy control network element set.

Specifically, a policy control network element set shown in FIG. 3 is first established in a communications system, and the policy control network element set includes at least two policy control network elements, for example, the source policy control network element and the target policy control network element shown in FIG. 3.

It should be understood that the policy control network element set may further include another policy control network element. A specific quantity of policy control network elements included in the policy control network element set is not limited in this embodiment of this application, provided that the policy control network element set includes at least the source policy control network element and the target policy control network element.

It should be further understood that a plurality of policy control network element sets may be established in the communications system, and each policy control network element set includes at least two policy control network elements. A method for load balancing between policy control network elements in the policy control network element set provided in this embodiment of this application is applicable to any policy control network element set established by a network device in the communications system. This application is described by using an example of load balancing between policy control elements in one policy control network element set.

S310. The source policy control network element establishes a policy session.

Specifically, the policy session is a PDU session of a terminal device. In other words, the source policy control network element establishes the policy session for a PDU session of a terminal device, and serves the policy session.

That the source policy control network element serves the policy session includes updating the policy session, pushing related information of the policy session, updating QoS of the policy session, and the like.

It should be understood that, in this embodiment of this application, a method used by the source policy control network element to establish the policy session is not limited, and may be any policy session establishment method in other approaches.

Specifically, the policy control network element in this embodiment of this application is a network element that can provide policy rule information for a control plane function network element (such as an AMF or SMF network element), for example, the PCF network element described above.

S311. The source policy control network element sends third information to the binding support network element.

Specifically, in a process in which the source policy control network element establishes the policy session, the source policy control network element sends the third information to the binding support network element, where the third information includes at least one piece of the following information session information of the PDU session corresponding to the policy session (which is referred to as session information of the policy session below), identification information of the source policy control network element, and a group identifier of a policy session group to which the policy session belongs.

The session information of the policy session is used to indicate the PDU session corresponding to the policy session, the identification information of the source policy control network element is used to indicate the source policy control network element that serves the policy session, and the policy session group identifier corresponding to the policy session is used to indicate the policy session group to which the policy session belongs.

It should be understood that the policy session group may further include other policy sessions, and the other policy sessions may be PDU sessions corresponding to a same terminal device or a plurality of terminal devices. This is not limited in this application.

Specifically, the session information of the policy session includes at least one piece of the following information IP address information of the policy session, DNN information of the policy session, S-NSSAI of the policy session, terminal device identification information of the policy session, application identification information of the policy session, and the like. The foregoing information is used by the binding support network element to determine the corresponding policy session.

Specifically, when establishing the policy session, the source policy control network element selects, for the policy session, one of a plurality of policy session group identifiers configured for the source policy control network element, for example, may select any policy session group identifier.

Alternatively, when only one policy session group identifier is configured for the source policy control network element, when establishing the policy session, the source policy control network element uses the policy session group identifier as a part of the policy session group identifier of the policy session.

Optionally, in some scenarios, when a same policy session group identifier is configured for all policy control network elements in the policy control network element set, the policy session group identifier of the policy session may be an identifier of the policy control network element set.

Optionally, in some scenarios, when a different policy session group identifier is configured for each policy control network element in the policy control network element set, the policy session group identifier of the policy session may consist of the identifier of the policy control network element set and a unique identifier in the policy control network element set.

Specifically, the identification information of the source policy control network element includes at least one piece of the following information IP address information of the source policy control network element, fully qualified domain name (FQDN) information of the source policy control network element, uniform resource identifier (URI) information of the source policy control network element, and the like.

Specifically, the binding support network element in this embodiment of this application is a network element used for binding support, for example, the BSF network element described above.

Further, after the source policy control network element successfully establishes the policy session, the following two possibilities exist.

In a first possibility, an application session corresponding to the policy session has been established between the source policy control network element and the application network element. In other words, the application network element already obtains, from the binding support network element, the identification information of the source policy control network element corresponding to the policy session, and successfully communicates with the source policy control network element.

In this case, FIG. 3 may further include S312 in which the source policy control network element sends first information to the application network element.

Specifically, when establishing communication with the application network element, the source policy control network element sends the first information to the application network element. The first information includes the policy session group identifier of the policy session.

In a second possibility, an application session corresponding to the policy session is not established between the source policy control network element and the application network element. In other words, after the source policy control network element successfully establishes the policy session, the application network element does not obtain, from the binding support network element, the identification information of the source policy control network element corresponding to the policy session.

Specifically, the application network element in this embodiment of this application is used to provide application-related information for the policy control network element, and obtain a session-related event from the policy control network element. For example, the application network element is the AF network element described above.

S320. The source policy control network element no longer serves the policy session.

When the source policy control network element satisfies a first preset condition, the source policy control network element no longer serves the policy session.

Specifically, the first preset condition may be any one of the following the source policy control network element is ready to be powered off, the source policy control network element is scaled in, or the source policy control network element is faulty.

Specifically, that the source policy control network element is ready to be powered off may be determining, based on a network status (busy or idle) of the communications system, to power off the source policy control network element in the policy control network element set.

Alternatively, when the source policy control network element is upgraded or maintained, the source policy control network element needs to be powered off.

Specifically, that the source policy control network element is scaled in may be performing a scale-in operation on the policy control network element set, specifically, scaling in the source policy control network element in the policy control network element set. The source policy control network element on which the scale-in operation is performed cannot serve the policy session.

Specifically, that the source policy control network element is faulty may be a state in which a hardware fault or a software fault occurs on the source policy control network element, and the source policy control network element cannot continue to work.

It should be noted that the first preset condition may alternatively be another condition. This is not limited in this embodiment.

Specifically, in this embodiment of this application, when the source policy control network element no longer serves the policy session, the policy session that the source policy control network element no longer serves needs to be served by another policy control network element in the policy control network element set. In this case, FIG. 3 further includes S321 in which the source policy control network element copies a policy session context corresponding to the policy session to the target policy control network element or a UDSF, so that the target policy control network element can serve the policy session.

It should be noted that the source policy control network element may copy the policy session context corresponding to the policy session to the target policy control network element or the UDSF when the first preset condition is satisfied, periodically before the first preset condition is satisfied, or immediately each time the policy session context changes.

Optionally, in some embodiments, the source policy control network element in this embodiment of this application may further update registration information of the source policy control network element in the network storage network element. In other words, the network storage network element is notified of deleting the policy session group to which the policy session belongs from a list of policy session groups served by the source policy control network element.

In this case, FIG. 3 may further include S322 in which the source policy control network element sends fourth information to the network storage network element, to indicate that the source policy control network element no longer serves the policy session group to which the policy session belongs. Further, the network storage network element identifies the source policy control network element as no longer serving the policy session group to which the policy session belongs.

Optionally, in some other embodiments, when the fourth information further includes the target policy control network element that serves the policy session, the network storage network element identifies the target policy control network element as a policy control network element that serves the policy session group to which the policy session belongs. The fourth information includes an identifier of the target policy control network element, the policy session group identifier, and a correspondence between the identifier of the target policy control network element and the policy session group identifier.

It should be understood that when the policy control network element set is used to serve a same policy session, the fourth information may not need to carry the policy session group identifier.

Specifically, the network storage network element in this embodiment of this application is a network element used for implementing a network storage function, for example, the NRF network element described above.

S330. The application network element fails to send a message related to the policy session to the source policy control network element.

Specifically, that the application network element fails to send the message related to the policy session to the source policy control network element may be understood as that the policy session is no longer served by the source policy control network element at a first moment. The policy session is served by the target policy control network element. The target policy control network element and the source policy control network element belong to the same policy control network element set. That the application network element fails to send the message related to the policy session to the source policy control network element may specifically be the application network element does not receive a response that is sent by the source policy control network element and indicates that the message related to the policy session is successfully received, or the application network element receives a rejection response that is sent by the source policy control network element and indicates that the message related to the policy session is rejected, where the rejection response includes a rejection reason (for example, scale-in of the source policy control network element), and the application network element can learn, based on the reason, that the message related to the policy session fails to be sent to the source policy control network element. That the application network element fails to send the message related to the policy session to the source policy control network element may be understood as that the application network element learns that the source policy control network element no longer serves the policy session.

Further, in this case, because the policy session is no longer served by the source policy control network element, the application network element fails to send the message related to the policy session to the source policy control network element.

It may also be understood that the first moment is a moment at which the source policy control network element no longer serves the policy session in S320 or a moment after the source policy control network element no longer serves the policy session. This embodiment of this application does not limit how long the first moment is later than the moment at which the source policy control network element no longer serves the policy session.

Optionally, in some embodiments, the message related to the policy session is a new QoS requirement of the application network element for the policy session, or application information (for example, application deployment information) related to the policy session, or a requirement of the application network element for reporting a new event of the policy session. This is not specifically limited in this embodiment.

Specifically, the application network element may fail to send the message related to the policy session to the source policy control network element in any one of the following cases.

In a first case corresponding to the first possibility in S311, the application network element has established communication with the source policy control network element before failing to send the message related to the policy session to the source policy control network element.

In other words, the application session corresponding to the policy session is established between the application network element and the source policy control network element. When the message related to the policy session needs to be sent at the first moment, the application network element still sends the message related to the policy session to the source policy control network based on the application session that corresponds to the policy session and that is previously established between the application network element and the source policy control network element.

In this case, because the source policy control network element no longer serves the policy session, the application network element fails to send the message related to the policy session to the source policy control network element. Alternatively, this may be understood as that the source policy control network element refuses to receive the message related to the policy session, or the message sent to the source policy control network element is unreachable (the corresponding source policy control network element is powered off).

In a second case corresponding to the second possibility in S311, the application network element does not establish communication with the source policy control network element before failing to send the message related to the policy session to the source policy control network element.

In other words, the application session corresponding to the policy session is not previously established between the application network element and the source policy control network element. In this embodiment of this application, before sending the message related to the policy session, the application network element queries the binding support network element for a policy control network element that serves the policy session.

In this case, FIG. 3 further includes S331 in which when the message related to the policy session needs to be sent at the first moment, the application network element first sends a second request message to the binding support network element. The second request message is used to query the policy control network element that serves the policy session.

The binding support network element does not subscribe to a status change notification of the source policy control network element, where the status change notification of the source policy control network element indicates that the source policy control network element no longer serves the policy session.

Therefore, the binding support network element still sends the identification information of the source policy control network element to the application network element based on the third information that is sent by the source policy control network element to the binding support network element when the source policy control network element establishes the policy session in S310, to indicate that the source policy control network element is the policy control network element that serves the policy session.

Therefore, the application network element sends the message related to the policy session to the source policy control network element based on the identification information, of the source policy control network element, received from the binding support network element. However, because the source policy control network element no longer serves the policy session, the application network element fails to send the message related to the policy session to the source policy control network element.

S340. The application network element sends a first request message to the binding support network element.

Specifically, regardless of a process indicated by the first case or a process indicated by the second case in S330, the application network element fails to send the message related to the policy session to the source policy control network element.

However, after failing to send the message related to the policy session to the source policy control network element, the application network element sends the first request message to the binding support network element. The first request message is used to query the target policy control network element that serves the policy session.

Optionally, the first request message includes indication information, and the indication information is used to indicate that the application network element fails to send the message related to the policy session to the source policy control network element.

Optionally, in some embodiments, after the application network element sends the message related to the policy session to the source policy control network element, when the application network element receives a second answer message sent by the source policy control network element, where the second answer message includes second information, the first request message further includes the second information, where the second information is used to indicate a reason why the application network element fails to send the message related to the policy session to the source policy control network element.

It should be understood that the application network element can receive, only when the first preset condition that the source policy control network element satisfies is not that the source policy control network element is powered off or faulty, the second answer message sent by the source policy control network element.

When the first preset condition satisfied by the source policy control network element is that the source policy control network element is powered off or faulty, the source policy control network element cannot send the second answer message to the application network element.

Optionally, in some embodiments, when the application network element and the source policy control network element satisfy the first possibility in S311, in other words, when the application network element receives the first information sent by the source policy control network element, and the first information includes the policy session group identifier of the policy session, the first request message includes the policy session group identifier of the policy session.

Further, if the first request message includes the policy session group identifier of the policy session, the first request message may or may not carry the session information of the policy session.

If the first request message does not include the policy session group identifier of the policy session, the first request message needs to carry the session information of the policy session.

S350. The binding support network element determines the target policy control network element.

Specifically, the binding support network element receives the first request message sent by the application network element, obtains the policy session group identifier of the policy session based on the first request message, and determines the target policy control network element based on the policy session group identifier.

That the binding support network element determines the target policy control network element based on the policy session group identifier includes the following several cases.

In a first case, when the first request message includes the policy session group identifier of the policy session, the binding support network element queries the network storage network element based on the policy session group identifier to determine the target policy control network element. The network storage network element stores a mapping relationship between a target policy control network element and a policy session group identifier.

Specifically, according to S322, if the network storage network element sets the identifier of the target policy control network element to the policy control network element that serves the policy session group to which the policy session belongs, when determining the policy session group identifier of the policy session from the first request message, the binding support network element can query the network storage network element based on the policy session group identifier to determine identification information of the target policy control network element. If the target policy control network element is not set in S322, the network storage network element selects, as the target policy control network element, one policy control network element from the policy control network element set.

In a second case, when the first request message does not include the policy session group identifier of the policy session but includes the session information of the policy session, the binding support network element first determines the policy session group identifier of the policy session based on the session information of the policy session, and then queries the network storage network element based on the policy session group identifier to determine the target policy control network element.

It should be understood that, if the third information sent by the source policy control network element to the binding support network element in S310 does not include the identification information of the source policy control network element, in other words, the binding support network element does not include the identification information of the source policy control network element, when receiving the first request message, the binding support network element queries the network storage network element based on the policy session group identifier of the policy session or the session information of the policy session to determine the target policy control network element. In this case, the first request message may not include the indication information in S340. In this case, the step S331 is not performed. In other words, each time the application network element queries the binding support network element for policy control network element information corresponding to the policy session, the binding support network element queries the network storage network element based on the policy session group identifier of the policy session to determine the policy control network element that serves the policy session. This can avoid sending, to the application network element, information of the source policy control network element that no longer serves the policy session.

S360. The binding support network element sends a first answer message to the application network element.

Specifically, after determining the target policy control network element, the binding support network element sends the first answer message to the application network element. The first answer message carries a first identifier, and the first identifier is the identifier of the target policy control network element.

Specifically, the identifier of the target policy control network element may be the identification information of the target policy control network element or other identification information that can be used to determine the target policy control network element.

The identification information of the target policy control network element may be any one piece of the following information IP address information of the target policy control network element, FQDN information of the target policy control network element, URI information of the target policy control network element, and the like.

It should be understood that, after learning of the identification information of the target policy control network element, the application network element sends the message related to the policy session to the target policy control network element.

Figure 4:
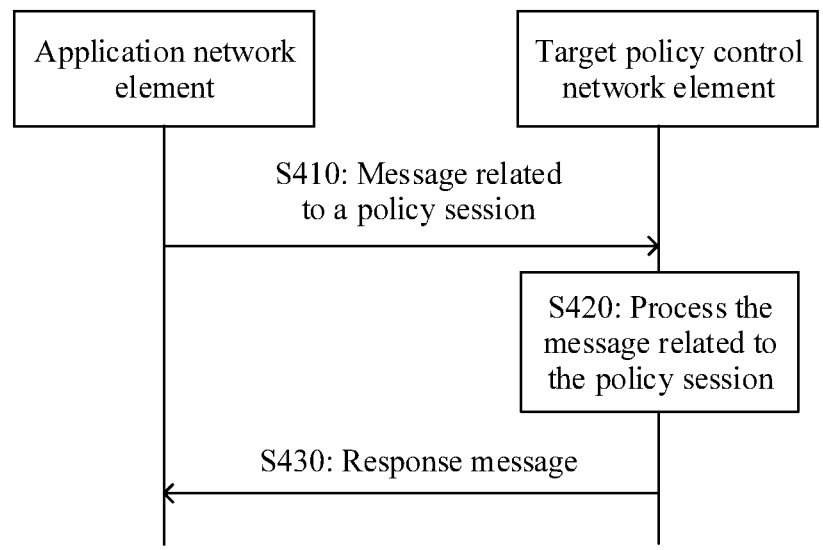
FIG. 4 is a schematic diagram of still another load balancing method according to this application.

The following describes a process of communication between an application network element and a target policy control network element in detail with reference to FIG. 4.

FIG. 4 is a schematic diagram of still another load balancing method according to this application.

S410. An application network element sends a message related to a policy session to a target policy control network element.

Specifically, after the application network element learns of identification information of the target policy control network element, that the application network element sends the message related to the policy session to the target policy control network element includes the following two cases.

In a first case corresponding to the first possibility in S311, the application network element has established communication with the source policy control network element (in other words, a corresponding application session has been established) before failing to send the message related to the policy session to the source policy control network element. In this case, the application network element generates a URI based on the identification information of the target policy control network element and a policy session resource identifier, received from the source policy control network element, corresponding to the policy session. The policy session resource identifier can be used to uniquely determine a resource (namely, a context) corresponding to the policy session in a policy control network element set.

Specifically, a format of the URI may be:
{apiRoot}/npcf-policyauthorization/v1/app-sessions/{appSessionId}

Herein, apiRoot includes the identification information of the target policy control network element, and appSessionId corresponds to the session resource identifier of the policy session. npcf-policyauthorization is used to indicate that a service type corresponding to the URI is a service, related to policy authorization, provided by a PCF, v1 indicates a version number of the service, and app-sessions indicates that the request operation is applied to the application session.

In a second case corresponding to the second possibility in S311, the application network element does not establish communication with the source policy control network element before failing to send the message related to the policy session to the source policy control network element. In this case, when the application network element sends the message related to the policy session to the target policy control network element, a generated URI does not carry appSessionId.

It should be understood that the URI is carried in the message related to the policy session, and is sent by the application network element to the target policy control network element.

S420. The target policy control network element processes the message related to the policy session.

That the target policy control network element processes the message related to the policy session includes the following two cases.

In a first case corresponding to the first case in S410, the URI carries appSessionId. In this case, the target policy control network element searches for the corresponding session based on appSessionId, and performs processing.

For example, the target policy control network element updates a policy and charging control (PCC) policy of the session.

In a first case corresponding to the second case in S410, the URI does not carry appSessionId. In this case, the target policy control network element creates, based on the message related to the policy session, the application session corresponding to the policy session.

S430. The target policy control network element sends a response message to the application network element.

In an implementation, that the target policy control network element adds, to the response message, an identifier of a policy session group corresponding to the policy session includes the following several cases.

In a first case, when the message that is related to the policy session and that is sent by the application network element is used to create the application session corresponding to the policy session, the target policy control network element sends the identifier of the policy session group corresponding to the policy session to the application network element.

In a second case, when the message that is related to the policy session and that is sent by the application network element is used to update the policy session, and the target policy control network element determines to change a policy session group identifier of the policy session, the target policy control network element also adds, to the response message, the identifier that is of the policy session group corresponding to the policy session and that is allocated by the target policy control network element to the policy session.

In this case, if the target policy control network element determines to change the policy session group identifier of the policy session, the target policy control network element may further send a message to all other network elements associated with the policy session, to send the updated policy session group identifier of the policy session to a related network element, for example, a session management network element corresponding to a PDU session associated with the policy session.

In addition, the target policy control network element also needs to update registration information in a binding support network element, and send the updated policy session group identifier of the policy session to the binding support network element.

It should be understood that the updated policy session group identifier of the policy session may be sent to the application network element as a part of appSessionId or an independent information element.

Figure 5:
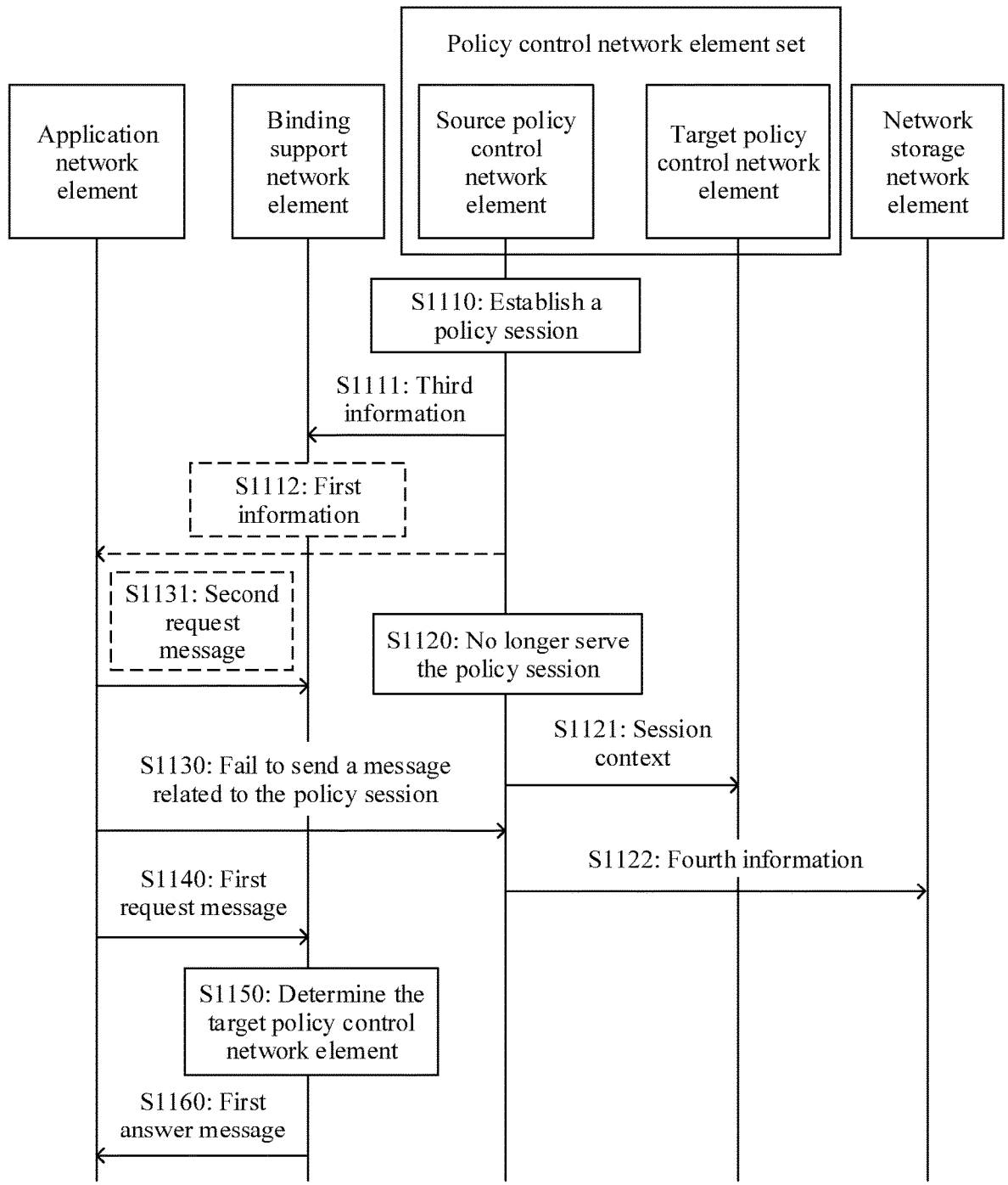
FIG. 5 is a schematic diagram of still another load balancing method according to this application.

The following describes a process of communication between a binding support network element and a policy control network element in detail with reference to FIG. 5.

FIG. 5 is a schematic diagram of still another load balancing method according to this application.

Step S1110. This step is similar to the step S310 shown in FIG. 3.

It should be understood that, in this application, an entity for establishing the policy session is not limited to which service of the source policy control network element, and may be any service that can establish the policy session. For example, the entity may be a source policy service described below, or a service other than the source policy service.

It should be further understood that a function that can be implemented by the source policy service in the embodiment shown in FIG. 5 corresponds to the source policy control network element in the embodiment shown in FIG. 3. Likewise, a function that can be implemented by a target policy service in the embodiment shown in FIG. 5 corresponds to the target policy control network element in the embodiment shown in FIG. 3.

Step S1111. This step is similar to the step S311. The third information includes session information of the policy session and at least one of an identifier of the source policy service corresponding to the policy session, an identifier of the source policy control network element, an identifier of a policy service set to which the source policy service belongs, and an identifier of a policy control network element set to which the source policy control network element belongs.

Optionally, the third information may further include binding indication information. The binding indication information is used to indicate that the policy session is bound to a policy control network element, a policy control network element set, a policy service (PCF service), or a policy service set. The policy service is a service of the policy control network element, for example, a policy authorization service of the policy control network element. The policy service set is a set of interchangeable same services in the policy control network element, or a set of interchangeable same services in the policy control network element set.

Specifically, the binding indication information may be defined as an enumerated type or a bitmap. Alternatively, the binding indication information is used as a part of an address of the policy service. For example, the third information includes address information of the policy service. When the address information includes an identifier of the policy service, an identifier of the policy service set, an identifier of the policy control network element, and an identifier of the policy control network element set, the address information indicates that the policy session is bound to the policy service. Alternatively, when the address information includes only an identifier of the policy service set, an identifier of the policy control network element, and an identifier of the policy control network element set, the address information is used to indicate that the policy session is bound to the policy service set. Alternatively, when the address information includes an identifier of the policy control network element and an identifier of the policy control network element set, the address information is used to indicate that the policy session is bound to the policy control network element. Alternatively, when the address information includes an identifier of the policy control network element set, the address information is used to indicate that the policy session is bound to the policy control network element set.

Alternatively, the binding indication information is supported in an implicit manner. For example, when the third information includes only an identifier of the policy control network element set, it is indicated that the policy session is bound to the policy control network element set. Alternatively, when the third information includes an identifier of the policy control network element set and an identifier of the policy service set, it is indicated that the policy session is bound to the policy service set. Alternatively, when the third information includes an identifier of the policy service set, an identifier of the policy control network element, and an identifier of the policy control network element set, it is indicated that the policy session is bound to the policy service set. Alternatively, when the third information includes an identifier of the policy control network element, an identifier of the policy control network element set, and an identifier of the policy service set, it indicated that the policy session is bound to the policy control network element. Alternatively, when the third information includes an identifier of the policy service, an identifier of the policy control network element, an identifier of the policy control network element set, and an identifier of the policy service set, it is indicated that the policy session is bound to the policy service.

Alternatively, in a possible form, the binding indication information may be an information element in the third information. The at least one of the identifier of the source policy service corresponding to the policy session, the identifier of the source policy control network element, the identifier of the policy service set to which the source policy service belongs, and the identifier of the policy control network element set to which the source policy control network element belongs may further be content in the binding indication information (in other words, the binding indication information includes the at least one of the identifier of the source policy service corresponding to the policy session, the identifier of the source policy control network element, the identifier of the policy service set to which the source policy service belongs, and the identifier of the policy control network element set to which the source policy control network element belongs). A specific implementation in which the binding indication information indicates a binding relationship may also be any one of the following (1) Content included in the binding indication information is used for indication. For example, when the binding indication information includes only the identifier of the policy control network element set, it is indicated that the policy session is bound to the policy control network element set, or when the binding indication information includes the identifier of the policy control network element set and the identifier of the policy service set, it is indicated that the policy session is bound to the policy service set. For other similar cases, refer to the descriptions in the foregoing implicit manner. (2) The binding indication information may further include another indication bit used to indicate which identifier in the binding indication information is bound to the policy session. For example, the binding indication information includes the identifier of the source policy service, the identifier of the source policy control network element, the identifier of the policy service set to which the source policy service belongs, and the identifier of the policy control network element set to which the source policy control network element belongs. When the indication bit in the binding indication information is 1 (the value is merely an example for description), it indicates that the policy session is bound to the policy control network element, when the indication bit is 2, it indicates that the policy session is bound to the policy control network element set, when the indication bit is 3, it indicates that the policy session is bound to the policy service (PCF service), or when the indication bit is 4, it indicates that the policy session is bound to the policy service set.

A specific manner of identifying the binding indication information is not specifically limited in this embodiment.

Correspondingly, the source policy control network element determines the binding indication information corresponding to the policy session. That the source policy control network element determines content in the third information based on the binding indication information includes, if the binding indication information indicates that the policy session is bound to the source policy service, the third information includes the identifier of the source policy service, the identifier of the policy service set to which the source policy service belongs, the identifier of the source policy control network element, and the identifier of the policy control network element set to which the source policy control network element belongs, if the binding indication information indicates that the policy session is bound to the source policy control network element in which the source policy service is located, the third information includes the identifier of the source policy control network element, and the identifier of the policy control network element set to which the source policy control network element belongs, if the binding indication information indicates that the policy session is bound to the policy service set to which the source policy service belongs, the third information includes the identifier of the policy service set to which the source policy service belongs, the identifier of the source policy control network element, and the identifier of the policy control network element set to which the source policy control network element belongs, or if the binding indication information indicates that the policy session is bound to the policy control network element set to which the source policy control network element belongs, the third information includes the identifier of the policy control network element set to which the source policy control network element belongs.

In other words, in this embodiment, in addition to the session information of the policy session, the third information further includes the at least one of the identifier of the source policy service, the identifier of the source policy control network element, the identifier of the policy control network element set to which the source policy control network element belongs, and the identifier of the policy service set to which the source policy service belongs. If the binding indication information is represented as the enumerated type or the bitmap, the third information further includes explicit binding indication information. Otherwise, the binding support network element determines, based on the third information, the binding indication information corresponding to the policy session.

When the application network element obtains, from the binding support network element, a policy service corresponding to the policy session, if the binding indication information in the third information corresponding to the policy session indicates that the policy session is bound to the source policy service, the binding support network element selects the source policy service (for an application network element supporting a service-based interface), or selects a policy control network element corresponding to the policy service (for an application network element not supporting the service-based interface). If the binding indication information indicates that the policy session is bound to the source policy control network element, the binding support network element selects a policy service from the source policy control network element (for the application network element supporting the service-based interface), or selects the policy control network element (for the application network element not supporting the service-based interface). If the binding indication information indicates that the policy session is bound to the policy service set, the binding support network element selects a policy service from the policy service set (for the application network element supporting the service-based interface), or selects the source policy control network element to which the policy service set belongs (for the application network element not supporting the service-based interface). If the binding indication information indicates that the policy session is bound to the policy control network element set, the binding support network element selects a policy service (for the application network element supporting the service-based interface) or a policy control network element (for the application network element not supporting the service-based interface) from the policy control network element set.

Optionally, in an implementation, regardless of whether the policy session is bound to the source policy service, the third information always includes the identifier of the source policy service. In this way, provided that the source policy service is still available, the binding support network element always selects the source policy service as the target policy service to serve the policy session. When the source policy service is unavailable, the binding support network element selects, from a source policy service set, a policy service equivalent to the source policy service as the target policy service, selects, from the source policy control network element, a policy service equivalent to the source policy service as the target policy service, or selects, from the policy control network element set, a policy service equivalent to the source policy service as the target policy service. In this case, the third information includes the identifier of the source policy service and at least one of the identifier of the policy service set, the identifier of the source policy control network element, and the identifier of the policy control network element set. Optionally, the third information further includes the binding indication information.

Corresponding to the first possibility in the step 311, first information in step S1112 may also include the binding indication information. In other words, the application network element obtains, from the source policy control network element, at least one of the identifier of the source policy service, the identifier of the source policy control network element, the identifier of the policy control network element set to which the source policy control network element belongs, the identifier of the policy service set to which the source policy service belongs, and the policy session group identifier. If the binding indication information is represented as the bitmap or the enumerated type, the first information further includes the binding indication information. Alternatively, as described above, the binding indication information is implied in content in the first information. Alternatively, if the at least one of the identifier of the source policy service, the identifier of the source policy control network element, the identifier of the policy control network element set to which the source policy control network element belongs, the identifier of the policy service set to which the source policy service belongs, and the policy session group identifier is registered in the binding support network element in the step S1111, when obtaining identification information of the source policy control network element corresponding to the policy session from the binding support network element last time, the application network element obtains, from the binding support network element, the at least one of the identifier of the source policy service, the identifier of the source policy control network element, the identifier of the policy control network element set corresponding to the source policy control network element, the identifier of the policy service set to which the source policy service belongs, and the policy session group identifier. Optionally, the application network element further obtains the binding indication information from the binding support network element. The application network element adds the binding indication information to a message when sending the message to the source policy service.

Step S1120. This step is similar to the step S320 except that, in this embodiment, the source policy control network element or the source policy service may also send a notification to the binding support network element, so that the binding support network element learns that the source policy control network element or the source policy service no longer serves the policy session group, or the NRF may also send a notification to the binding support network element, so that the binding support network element learns that the source policy control network element or the source policy service no longer serves the policy session group.

Step 1130. In a second case, because the binding support network element learns, in the step 1120, that the source policy control network element or the source policy service that corresponds to the policy session no longer serves the policy session, the binding support network element may select, based on the identifier of the policy control network element set and/or the identifier of the policy service set that are/is registered in the step S1111, another policy control network element or policy service from the policy control network element set to which the source policy control network element belongs, to serve the policy session. This is different from the step 330. Therefore, in the second case, the case in which the binding support network element still selects the source policy control network element or the source policy service for the policy session in the step 330 does not occur. Therefore, in this embodiment, the second case does not cause the application network element to fail to send the message related to the policy session to the policy control network element.

Step 1140. Different from the step 340, S1140 is only for the first case in this embodiment.

In this embodiment, the application network element may not need to send the indication information in the first request message. The application network element may send only the session information to the binding support network element. Because the binding support network element already learns that the source policy control network element or the source policy service is unavailable, the binding support network element may select, based on the identifier of the policy control network element set, the identifier of the policy service set, and the identifier of the source policy control network element that are registered in the step S1111, another available policy control network element or policy service to serve the policy session.

In addition, if the application network element does not support the service-based interface, the application network element needs to send the first request message to the target policy control network element.

Step 1150. Based on the step 350, in this embodiment, for the first case in the step S350, the first request message may further include at least one of the identifier of the policy service set, the identifier of the source policy control network element, and the identifier of the policy control network element set based on an indication of the received binding indication information. If the first request message includes the identifier of the policy service set and the identifier of the policy control network element set, the binding support network element selects an available policy service from the policy service set in the policy control network element set, or selects, from the policy control network element set, a policy service equivalent to the policy service of the policy service set. If the first request message includes the identifier of the source policy control network element and the identifier of the policy control network element set, the binding support network element selects an available policy service from the source policy control network element, or selects a policy service of another policy control network element from the policy control network element set. If the first request message includes the identifier of the policy control network element set, the binding support network element selects an available policy service or policy control network element from the policy control network element set. Alternatively, the application network element does not send the first request message to the binding support network element, but sends the first request message to the NRF. The NRF selects the target policy service or the target policy control network element based on content included in the first request message.

Based on the step 350, in this embodiment, for the second case in the step S350, when the first request message includes the session information of the policy session, if the binding indication information corresponding to the policy session indicates that the policy session is bound to the policy service, and the policy service corresponding to the policy session is available, the binding support network element selects the policy service corresponding to the policy session. If the policy service corresponding to the policy session is unavailable, the binding support network element selects an equivalent policy service from the policy control network element in which the policy service is located, selects an equivalent policy service from the policy service set to which the policy service belongs, or selects an equivalent policy service from the policy control network element set to which the policy service belongs. If the binding indication information indicates that the policy session is bound to the policy control network element, and the source policy control network element is available, the binding support network element selects a policy service for the session from the source policy control network element. If the source policy control network element is unavailable, the binding support network element selects a policy service of another policy control network element from the policy control network element set. If the binding indication information indicates that the policy session is bound to the policy service set, the binding support network element selects a policy service from the policy service set, or selects a policy service from the policy control network element set to which the policy service belongs. If the binding indication information indicates that the policy session is bound to the policy control network element set, the binding support network element selects a policy service from the policy control network element set.

In addition, when the application network element does not support the service-based interface, if the binding indication information indicates that the policy session is bound to the policy service or the policy control network element, the binding support network element selects the policy control network element bound to the policy session. If the binding indication information indicates that the policy session is bound to the policy service set or the policy control network element set, the binding support network element selects a policy control network element from the policy control network element set.

Step S1160. This step is similar to the step S360 except that the first answer message carries an identifier of the selected target policy service or an identifier of the selected target policy control network element. In addition, for the application network element not supporting the service-based interface, the binding support network element may not send the first answer message, but directly forward the message received in the step S1140 to the selected target policy control network element or redirect the message to the target policy control network element by using an AF.

Optionally, the first answer message my further include the binding indication information. In this way, the application network element adds the binding indication information to a request message when sending the request message to the selected policy service.

The identifier of the target policy control network element may be any one piece of the following information IP address information of the target policy control network element, FQDN information of the target policy control network element, URI information of the target policy control network element, and the like.

In addition, in the first case in the step S410, the application network element has established communication with the source policy control network element (in other words, the corresponding application session has been established). If the application network element is the application network element not supporting service-based interface (for example, an application network element supporting an Rx interface), the application network element sends a new application session establishment request to the target policy control network element. In the request message, the application network element sends a session identifier of the application session established by the application network element for the source policy control network element to the target policy control network element. The session identifier of the established application session is used by the target policy control network element to uniquely determine a context corresponding to the established application session. Therefore, the target policy control network element determines that the application session establishment is actually an update of the established application session. Correspondingly, in the step S420, the target policy control network element processes the context corresponding to the established application session, for example, updates a PCC policy of the session.

It should be noted that, when the application network element does not support the service-based interface, the binding support network element selects the policy control network element, when the application network element supports the service-based interface, the binding support network element selects the policy service, where the policy service is homed to a policy control network element.

It should be noted that, it is assumed that the policy control network element set includes only one policy session group. If there are a plurality of policy session groups in the policy control network element set, the third information further includes an identifier of a policy session group. In this case, in the step 1150, the binding support network element further selects, based on the identifier of the session group, a target policy service or a target policy control network element that corresponds to the policy session group.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the processes included in the schematic diagrams of the load balancing methods in FIG. 2 to FIG. 5 are not necessarily mandatory steps for implementing load balancing described in the embodiments of this application. Some steps are optional, and some steps are mandatory. Specifically, refer to the detailed descriptions in FIG. 2 to FIG. 5.

The load balancing methods in the embodiments of this application are described above in detail with reference to FIG. 2 to FIG. 5. The following describes in detail network elements in the embodiments of this application with reference to FIG. 6 to FIG. 11.

Figure 6:
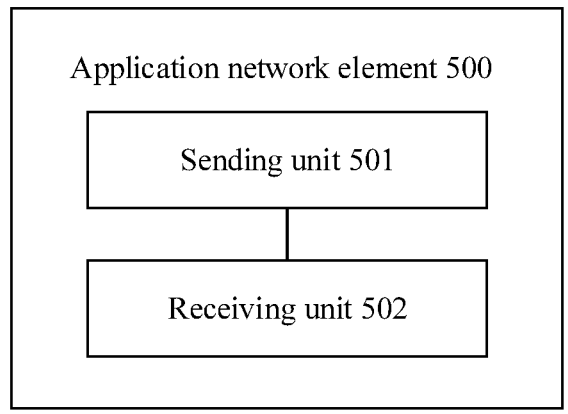
FIG. 6 is a schematic block diagram of an application network element according to an embodiment of this application.

FIG. 6 is a schematic block diagram of an application network element 500 according to an embodiment of this application. The application network element includes a sending unit 501 and a receiving unit 502.

The sending unit 501 is configured to, after failing to send a message related to a policy session to a source policy control network element, send a first request message to a binding support network element, where the first request message is used to query a target policy control network element that serves the policy session, the target policy control network element and the source policy control network element belong to a same policy control network element set, the first request message includes a policy session group identifier of the policy session and/or session information of the policy session, the policy session group identifier of the policy session is used to indicate a policy session group to which the policy session belongs, and the session information of the policy session is used to indicate the policy session.

The receiving unit 502 is configured to receive a first answer message sent by the binding support network element, where the first answer message carries a first identifier, and the first identifier is an identifier of the target policy control network element.

Optionally, the first request message includes indication information, and the indication information is used to indicate that the sending unit 501 fails to send the message related to the policy session to the source policy control network element.

Specifically, before the sending unit 501 sends the first request message to the binding support network element, if the receiving unit receives first information sent by the source policy control network element, the first information includes the policy session group identifier of the policy session.

Specifically, the policy session group identifier includes at least an identifier of the policy control network element set.

Specifically, after the sending unit 501 sends the message related to the policy session to the source policy control network element, if the receiving unit 502 receives a second answer message sent by the source policy control network element, where the second answer message includes second information, the first request message further includes the second information, where the second information is used to indicate a reason why the sending unit fails to send the message related to the policy session to the source policy control network element.

It should be understood that the sending unit 501 and the receiving unit 502 in this embodiment of this application may be implemented by a transceiver or a transceiver-related circuit component.

Figure 7:
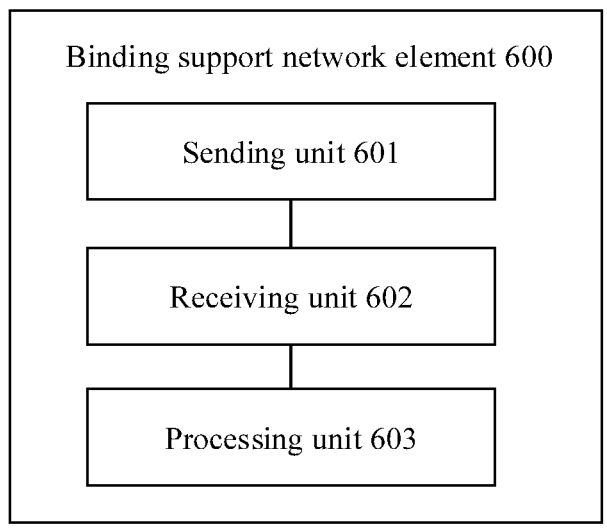
FIG. 7 is a schematic block diagram of a binding support network element according to an embodiment of this application.

FIG. 7 is a schematic block diagram of a binding support network element 600 according to an embodiment of this application. The binding support network element includes a receiving unit 601, a sending unit 602, and a processing unit 603.

The receiving unit 601 is configured to receive a first request message sent by an application network element, where the first request message is used to query a target policy control network element that serves a policy session, the first request message includes a policy session group identifier of the policy session and/or session information of the policy session, the policy session group identifier of the policy session is used to indicate a policy session group to which the policy session belongs, and the session information of the policy session is used to indicate the policy session.

The processing unit 603 is configured to determine the target policy control network element based on the first request message.

The sending unit 602 is configured to send a first answer message to the application network element, where the first answer message carries a first identifier, and the first identifier is an identifier of the target policy control network element.

Specifically, that the processing unit 603 determines the target policy control network element based on the first request message includes, when the first request message includes the policy session group identifier of the policy session, the processing unit 603 queries a network storage network element based on the policy session group identifier to determine identification information of the target policy control network element, or when the first request message includes the session information of the policy session, the processing unit 603 determines the policy session group identifier based on the session information of the policy session, and queries a network storage network element based on the policy session group identifier to determine identification information of the target policy control network element.

Optionally, when the policy session is established by a source policy control network element, the receiving unit 601 is further configured to receive third information from the source policy control network element, where the third information includes the session information of the policy session and the policy session group identifier of the policy session.

The target policy control network element and the source policy control network element belong to a same policy control network element set.

Optionally, the first request message includes indication information, and the indication information is used to indicate that the application network element fails to send a message related to the policy session to the source policy control network element.

Specifically, the processing unit 603 determines, based on the indication information, that the source policy control network element no longer serves the policy session.

Specifically, the policy session group identifier includes at least an identifier of the policy control network element set to which the source policy control network element or the target policy control network element belongs.

It should be understood that, in this embodiment of this application, the processing unit 603 may be implemented by a processor or a processor-related circuit component, and the sending unit 602 and the receiving unit 601 may be implemented by a transceiver or a transceiver-related circuit component.

Figure 8:
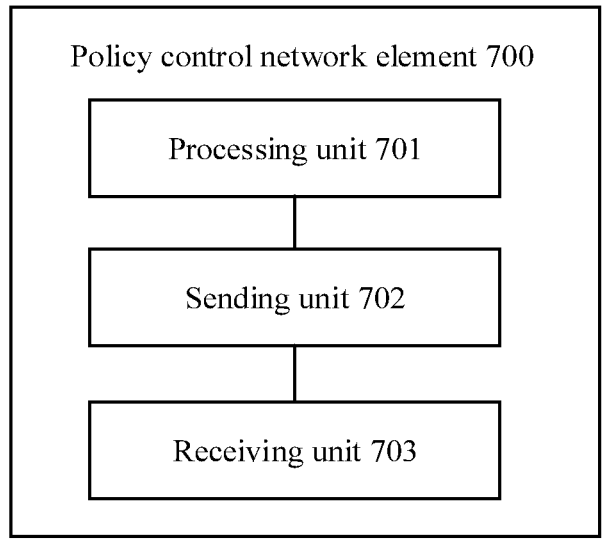
FIG. 8 is a schematic block diagram of a source policy control network element according to an embodiment of this application.

FIG. 8 is a schematic block diagram of a source policy control network element 700 according to an embodiment of this application. The source policy control network element includes a processing unit 701, a sending unit 702, and a receiving unit 703.

The processing unit 701 is configured to establish a policy session, where the policy session is served by the source policy control network element.

The sending unit 702 is configured to send third information to a binding support network element, where the third information includes session information of the policy session and a policy session group identifier of the policy session.

The session information of the policy session is used to indicate the policy session, and the policy session group identifier of the policy session is used to indicate a policy session group to which the policy session belongs.

Optionally, when the policy session is no longer served by the source policy control network element, the source policy control network element further includes the receiving unit 703, configured to refuse to receive a message that is related to the policy session and that is sent by an application network element.

Optionally, when the source policy control network element establishes communication with the application network element before the receiving unit 703 refuses to receive the message that is related to the policy session and that is sent by the application network element, the sending unit 702 is further configured to send first information to the application network element, where the first information includes the policy session group identifier of the policy session.

Specifically, the policy session group identifier includes at least an identifier of a policy control network element set to which the source policy control network element belongs.

Optionally, when the receiving unit 703 refuses to receive the message that is related to the policy session and that is sent by the application network element, the sending unit 702 is further configured to send a second answer message to the application network element, where the second answer message includes second information.

The second information is used to indicate a reason why the receiving unit refuses to receive the message that is related to the policy session and that is sent by the application network element.

It should be understood that, in this embodiment of this application, the processing unit 701 may be implemented by a processor or a processor-related circuit component, and the sending unit 702 and the receiving unit 703 may be implemented by a transceiver or a transceiver-related circuit component.

Figure 9:
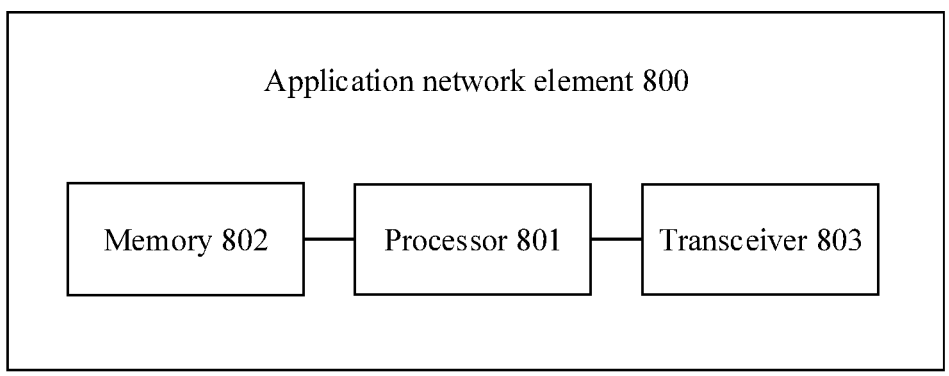
FIG. 9 is another schematic block diagram of an application network element according to an embodiment of this application.

As shown in FIG. 9, an embodiment of this application further provides an application network element 800. The application network element 800 includes a processor 801, a memory 802, and a transceiver 803. The memory 802 stores an instruction or a program, and the processor 801 is configured to execute the instruction or the program stored in the memory 802. When the instruction or the program stored in the memory 802 is executed, the transceiver 803 is configured to perform operations performed by the receiving unit 502 and the sending unit 501 in the embodiment shown in FIG. 6.

Figure 10:
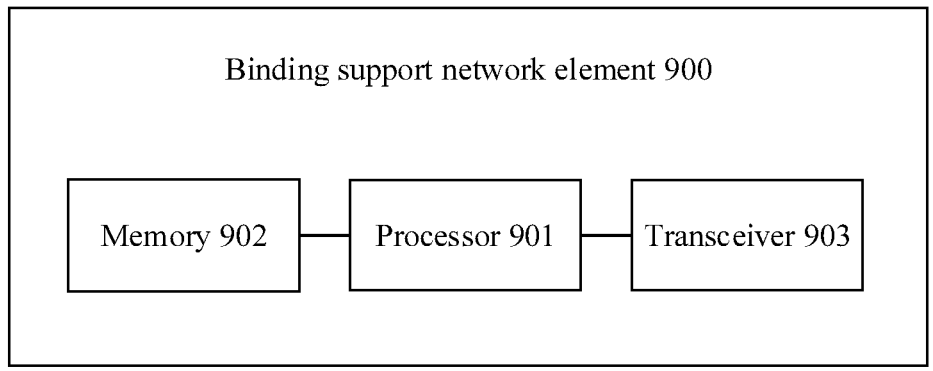
FIG. 10 is another schematic block diagram of a binding support network element according to an embodiment of this application.

As shown in FIG. 10, an embodiment of this application further provides a binding support network element 900. The binding support network element 900 includes a processor 901, a memory 902, and a transceiver 903. The memory 902 stores an instruction or a program, and the processor 901 is configured to execute the instruction or the program stored in the memory 902. When the instruction or the program stored in the memory 902 is executed, the processor 901 is configured to perform an operation performed by the processing unit 603 in the embodiment shown in FIG. 7, and the transceiver 903 is configured to perform operations performed by the receiving unit 602 and the sending unit 601 in the embodiment shown in FIG. 7.

Figure 11:
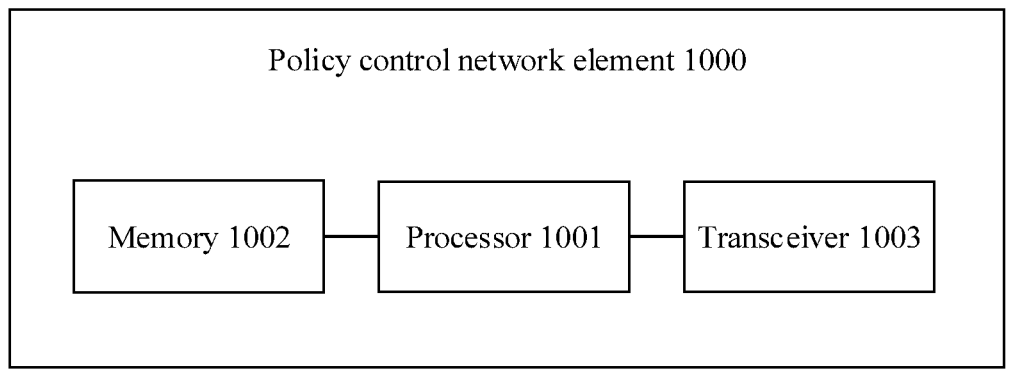
FIG. 11 is another schematic block diagram of a source policy control network element according to an embodiment of this application.

As shown in FIG. 11, an embodiment of this application further provides a source policy control network element 1000. The source policy control network element 1000 includes a processor 1001, a memory 1002, and a transceiver 1003. The memory 1002 stores an instruction or a program, and the processor 1001 is configured to execute the instruction or the program stored in the memory 1002. When the instruction or the program stored in the memory 1002 is executed, the processor 1001 is configured to perform an operation performed by the processing unit 701 in the embodiment shown in FIG. 8, and the transceiver 1003 is configured to perform operations performed by the receiving unit 703 and the sending unit 702 in the embodiment shown in FIG. 8.

It should be understood that the processor mentioned in the embodiments of the present disclosure may be a CPU, or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in the embodiments of the present disclosure may be a volatile memory or a nonvolatile memory, or may include a volatile memory and a nonvolatile memory. The nonvolatile memory may be a read-only memory (ROM), a programmable read-only memory (PROM), an EPROM, an electrically erasable programmable read-only memory (EEPROM), or a flash memory. The volatile memory may be a random-access memory (RAM), and is used as an external cache. Through example description but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or transistor logic device, or a discrete hardware component, the memory (storage module) is integrated into the processor.

It should be noted that the memory described in this specification is intended to include but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A binding support system, comprising:
 a binding support network element configured to:
  receive, from a source policy control network element, first information comprising session information of a policy session and at least one of a first identifier of the source policy control network element or a second identifier of a policy control network element set to which the source policy control network element belongs, wherein the session information indicates the policy session;
  receive, from an application network element, a first request message to query a target policy control network element that serves the policy session, wherein the first request message comprises the session information; and
  determine the target policy control network element based on the first information and the first request message; and
 the source policy control network element configured to:
  establish the policy session; and
  send the first information to the binding support network element.

2. The binding support system of claim 1, wherein the first information comprises binding indication information indicating that the policy session is bound to either the source policy control network element in which a source policy service is located or the policy control network element set, and wherein the source policy service belongs to the source policy control network element.

3. The binding support system of claim 2, wherein the source policy control network element is further configured to:
 determine the binding indication information corresponding to the policy session; and
 determine the first information based on the binding indication information, wherein the first information comprises the first identifier and the second identifier, in case that the binding indication information indicates that the policy session is bound to the source policy control network element, and wherein the first information comprises the second identifier, in case that the binding indication information indicates that the policy session is bound to the policy control network element set.

4. The binding support system of claim 1, wherein the source policy control network element is further configured to refuse to receive a message related to the policy session from the application network element, in case that the source policy control network element no longer serves the policy session.

5. The binding support system of claim 4, wherein the source policy control network element is further configured to send, to the application network element, second information comprising the second identifier when communication between the source policy control network element and the application network element is established.

6. The binding support system of claim 2, wherein the binding support network element is further configured to send the binding indication information to the application network element.

7. The binding support system of claim 1, wherein the binding support network element is further configured to send identification information of a target policy service to the application network element.

8. The binding support system of claim 1, wherein the session information comprises at least one of Internet Protocol (IP) address information of the policy session, data network name (DNN) information of the policy session, single-network slice selection assistance information (S-NSSAI) of the policy session, or terminal device identification information of the policy session.

9. A binding support network element, comprising:
 a processor; and
 a memory coupled to the processor and storing instructions that, when executed by the processor, cause the binding support network element to:
  receive, from a source policy control network element, first information comprising session information of a policy session and at least one of a first identifier of the source policy control network element or a second identifier of a policy control network element set to which the source policy control network element belongs, wherein the session information indicates the policy session;
  receive, from an application network element, a first request message to query a target policy control network element that serves the policy session, wherein the first request message comprises the session information; and
  determine the target policy control network element based on the first information and the first request message.

10. The binding support network element of claim 9, wherein the first information comprises binding indication information indicating that the policy session is bound to either the source policy control network element or the policy control network element set.

11. The binding support network element of claim 10, wherein the instructions further cause the binding support network element to send the binding indication information to the application network element.

12. The binding support network element of claim 9, wherein the instructions further cause the binding support network element to send identification information of a target policy service to the application network element.

13. A source policy control network element, comprising:
a processor; and
a memory coupled to the processor and storing instructions that, when executed by the processor, cause the source policy control network element to:
  establish a policy session served by the source policy control network element; and
  send first information to a binding support network element,
  wherein the first information comprises session information of the policy session and a first identifier of a policy control network element set to which the source policy control network element belongs, and
  wherein the session information indicates the policy session.

14. The source policy control network element of claim 13, wherein the instructions further cause the source policy control network element to refuse to receive a message related to the policy session from an application network element, in case that the source policy control network element no longer serves the policy session.

15. The source policy control network element of claim 13, wherein the instructions further cause the source policy control network element to send, to an application network element, second information comprising the first identifier when communication between the source policy control network element and the application network element is established.

16. The source policy control network element of claim 13, wherein the first information further comprises a second identifier of the source policy control network element.

17. The source policy control network element of claim 13, wherein the first information further comprises binding indication information indicating that the policy session is bound to the source policy control network element that a source policy service is located, or the policy control network element set, and wherein the source policy service belongs to the source policy control network element.

18. The source policy control network element of claim 17, wherein the instructions further cause the source policy control network element to:
  determine the binding indication information corresponding to the policy session; and
  determine the first information based on the binding indication information, wherein the first information comprises the first identifier and a second identifier of the policy control network element set, in case that the binding indication information indicates that the policy session is bound to the source policy control network element, and wherein the first information comprises the second identifier, in case that the binding indication information indicates that the policy session is bound to the policy control network element set.

19. The source policy control network element of claim 17, wherein the instructions further cause the source policy control network element to send, to an application network element, second information comprising a second identifier of the policy control network element set when communication between the source policy control network element and the application network element is established.

20. The source policy control network element of claim 17, wherein the session information comprises at least one of Internet Protocol (IP) address information of the policy session, data network name (DNN) information of the policy session, single-network slice selection assistance information (S-NSSAI) of the policy session, or terminal device identification information of the policy session.

* * * * *